US006819221B1

United States Patent
Amtmann et al.

(10) Patent No.: US 6,819,221 B1
(45) Date of Patent: Nov. 16, 2004

(54) METHOD OF DETERMINING A TIME VALUE REPRESENTING AT LEAST A PART OF THE COMMUNICATION TIME INTERVAL OF A TRANSPONDER WITH A COMMUNICATION DEVICE

(76) Inventors: Franz Amtmann, Rechbauerstrasse 15, A-8010 Graz (AT); Christoph Kauer, A-8020 Graz, Graz (AT)

( * ) Notice: Subject to any disclaimer, the term of this patent is extended or adjusted under 35 U.S.C. 154(b) by 653 days.

(21) Appl. No.: 09/630,287

(22) Filed: Aug. 1, 2000

(30) Foreign Application Priority Data

Aug. 4, 1999 (EP) .............................................. 99890258

(51) Int. Cl.[7] .............................. H04Q 5/22; H04Q 7/00
(52) U.S. Cl. ...................... 340/10.3; 340/10.1; 370/314
(58) Field of Search ........................... 340/10.3, 10.31, 340/10.32, 10.1; 342/135, 357.01, 450, 458; 370/314

(56) References Cited

U.S. PATENT DOCUMENTS

| | | | | | |
|---|---|---|---|---|---|
| 5,345,231 A | * | 9/1994 | Koo et al. | ............. | 340/870.31 |
| 5,440,559 A | * | 8/1995 | Gaskill | ........................ | 370/314 |
| 5,515,056 A | * | 5/1996 | Henderson et al. | ......... | 342/125 |
| 5,621,412 A | * | 4/1997 | Sharpe et al. | ............. | 340/10.33 |
| 5,646,607 A | * | 7/1997 | Schurmann et al. | ....... | 340/10.2 |
| 5,892,576 A | * | 4/1999 | Gaechter | .................. | 356/5.05 |
| 5,899,957 A | * | 5/1999 | Loomis | ...................... | 701/214 |
| 5,990,833 A | * | 11/1999 | Ahlbom et al. | ............. | 342/417 |
| 6,028,503 A | * | 2/2000 | Preishuberpflugl et al. | ...... | 340/10.4 |
| 6,067,040 A | * | 5/2000 | Puglia | ........................ | 342/134 |
| 6,091,342 A | * | 7/2000 | Janesch et al. | ............ | 340/10.2 |
| 6,097,278 A | * | 8/2000 | Arnold et al. | ............. | 340/10.1 |

FOREIGN PATENT DOCUMENTS

EP    988902482    8/1998

* cited by examiner

Primary Examiner—Michael Horabik
Assistant Examiner—Nam Nguyen
(74) Attorney, Agent, or Firm—Kevin Simons

(57) ABSTRACT

The disclosure describes a communication device and a transponder adapted to provide contactless communication with the communication device include time-value determiner with the aid of which at least one time value can be determined, which time value is representative of at least a part of the communication time interval which starts at a starting instant and ends at an ending instant, in which communication time interval communication between the communication device and the transponder is possible.

25 Claims, 4 Drawing Sheets

METHOD OF DETERMINING A TIME VALUE REPRESENTING AT LEAST A PART OF THE COMMUNICATION TIME INTERVAL OF A TRANSPONDER WITH A COMMUNICATION DEVICE

BACKGROUND OF THE INVENTION

The invention relates to a method as defined in the opening part of Claim 1.

The invention further relates to a communication device as defined in the opening part of claim 9.

The invention further relates to a transponder as defined in the opening part of claim 14.

The invention further relates to a circuit as defined in the opening part of claim 20.

A method as defined in the opening part of claim 1, a communication device as defined in the opening part of claim 9, a transponder as defined in the opening part of claim 14, and a circuit as defined in the opening part of claim 20 have been realized and put onto the market by the Applicant and are consequently known.

The known realizations are adapted to determine the characteristic values mentioned hereinafter, namely in the first place the value of the input capacitance of a transponder circuit existing between the input terminals of such a circuit and in the second place the value of the modulation index caused by load modulation means of a transponder circuit and appearing between circuit terminals of a such a circuit. In addition, the known realizations are also suitable for determining a correct digital functionality of a transponder circuit. With regard to the known realizations reference is also made to the European Patent Application having the application number 98 890 248.2 and filed on Aug. 21, 1998.

SUMMARY OF THE INVENTION

It is an object of the invention to adapt a method as defined in the opening part of claim 1, a communication device as defined in the opening part of claim 9, a transponder as defined in the opening part of claim 14, and a circuit as defined in the opening part of claim 20 in such a manner that it is possible to determine a characteristic value relating to the communication between a communication device and a transponder, which could not be determined hitherto, as a result of which a series of further possibilities of use are obtained for such a communication device, for such a transponder and for such a circuit.

According to the invention, in order to achieve the afore-mentioned object with a method as defined in the opening part of claim 1, the characteristic feature disclosed in the characterizing part of claim 1 has been provided.

Furthermore, according to the invention, in order to achieve the afore-mentioned object with a communication device as defined in the opening part of claim 9, the characteristic feature disclosed in the characterizing part of claim 9 has been provided.

Furthermore, according to the invention, in order to achieve the afore-mentioned object with a transponder as defined in the opening part of claim 14, the characteristic feature disclosed in the characterizing part of claim 14 has been provided.

Furthermore, according to the invention, in order to achieve the afore-mentioned object with a circuit as defined in the opening part of claim 20, the characteristic feature disclosed in the characterizing part of claim 20 has been provided.

As a result of the provision of the characteristic features in accordance with the invention it is achieved that now at least one time value can be determined which represents at least a part of the communication time interval in which a transponder has a communication connection with a communication device. In practice, this novel possibility in accordance with the invention provides a range of hitherto unrealizable potential uses. For example, in the case of an access control system formed by means of transponders and at least one communication device it is possible, by determining the at least one time value representing the communication time interval in which a transponder has a communication connection with a communication device, to determine when the transponder is in communication with the communication device during a communication time interval exceeding a given threshold value, which may be indicative of an operating fault or an unusual behavior of a user who carries the transponder, thus subsequently enabling an automatic failure indication or warning indication to be started and carried through. Further potential uses are obtained in all cases in which the communication time interval in which a transponder is in communication with a communication device plays a part.

It is to be borne in mind that the communication time interval is to be understood to means that time interval in which communication is possible between a transponder and a communication device, i.e. in which a transponder has a communication connection with a communication device, which is the case when the transponder is located within a communication range between the communication device and the transponder. In this respect it is to be noted that the communication range depends on the spatial position of the transponder with respect to the communication device. Moreover, it is to be noted that the duration of the method in accordance with the invention, for determining at least one time value representing at least a part of the communication time interval, preferably covers only a part of the length of the communication time interval.

For a method in accordance with the invention, a communication device in accordance with the invention, a transponder in accordance with the invention and a circuit in accordance with the invention it has proved to be particularly advantageous when, in addition, the characteristic features disclosed in claims 2, 10, 15 and 21, respectively are provided. By providing these characteristic features it is achieved in a simple manner that, in addition to at least one time value representing at least a part of a communication time interval, it is also possible to determine, without any additional expense, that a transponder or a circuit of a transponder no longer has a communication connection with a communication device, i.e. has left the communication range of a communication device.

In the above context it has proved to be particularly advantageous when, in addition, the characteristic features disclosed in claims 1, 9, 14 and 15, and 20 and 21, respectively are provided. By providing these characteristic features in accordance with the invention it is possible to determine at least one time value, which represents at least a part of the communication time interval which begins at a starting instant and which ends at an ending instant, in a particularly accurate manner.

In the above context it has proved to be very advantageous when, in addition, the characteristic features disclosed in claims 2, 10, 16 and 22, respectively are provided. This is particularly advantageous because such a counting stage provided as time-value determining stage can be realized simply in digital form.

However, it is to be noted that a time-value determining stage can also be realized at least partly in digital form, for example by means of a capacitor which can be charged with the aid of a charging circuit during a communication time interval, as a result of which the capacitor voltage appearing at a given instant within the communication time interval always forms a measure of a part of the communication time interval, i.e. a time value.

In connection with the determination of a time value which represents a communication time interval which begins at a starting instant and which ends at an ending instant, it has also proved to be advantageous when, in addition, the characteristic features disclosed in claims 5, 11, 17 and 18, and 23 and 24, respectively are provided. Such an embodiment is advantageous because in such an embodiment the desired result is accomplished by means which are present anyway, which in particular resides in the fact that the presence detection means and the absence detection means are formed by a so-termed power-on reset circuit which is present anyway in each circuit for a transponder.

In the above context it has also proved to be very advantageous when, in addition, the characteristic features disclosed in claims 6, 12, 19 and 25, respectively are provided. In the present case the advantage also resides in the fact that such a counting stage can be realized simply in digital form.

Furthermore, owing to the provision of these characteristic features in accordance with the invention it is possible in a simple manner and substantially without any additional means to calculate the physical time interval corresponding to a determined time value, i.e. to a numerical value determined as the time value, for example to enable this time interval to be displayed, which may be advantageous for monitoring purposes.

Furthermore, owing to the provision of these characteristic features in accordance with the invention it is possible in a simple manner and substantially without any additional means to determine the position where a transponder is located in relation to a communication device. Such a position determination is of great advantage, for example in conjunction with conveyor belts for items of luggage which each have an associated transponder included in an identification loop, because in this way the position of successive items of luggage carried by a conveyor belt can be determined very accurately in a simple manner.

Furthermore, this guarantees that in the case, which occurs very often in practice, that a plurality of transponders communicate simultaneously with a communication device, each of these transponders can be identified unambiguously and, consequently, at least one time value representing at least a part of the communication time interval of each respective transponder can be determined.

The afore-mentioned as well as further aspects of the invention will become apparent from the embodiments described hereinafter by way of example and will be elucidated with reference to these embodiments.

BRIEF DESCRIPTION OF THE DRAWINGS

The invention will now be described in more detail with reference to the drawings, which shows two embodiments given by way of example but to which the invention is not limited.

DETAILED DESCRIPTION OF THE INVENTION

Figure 1:
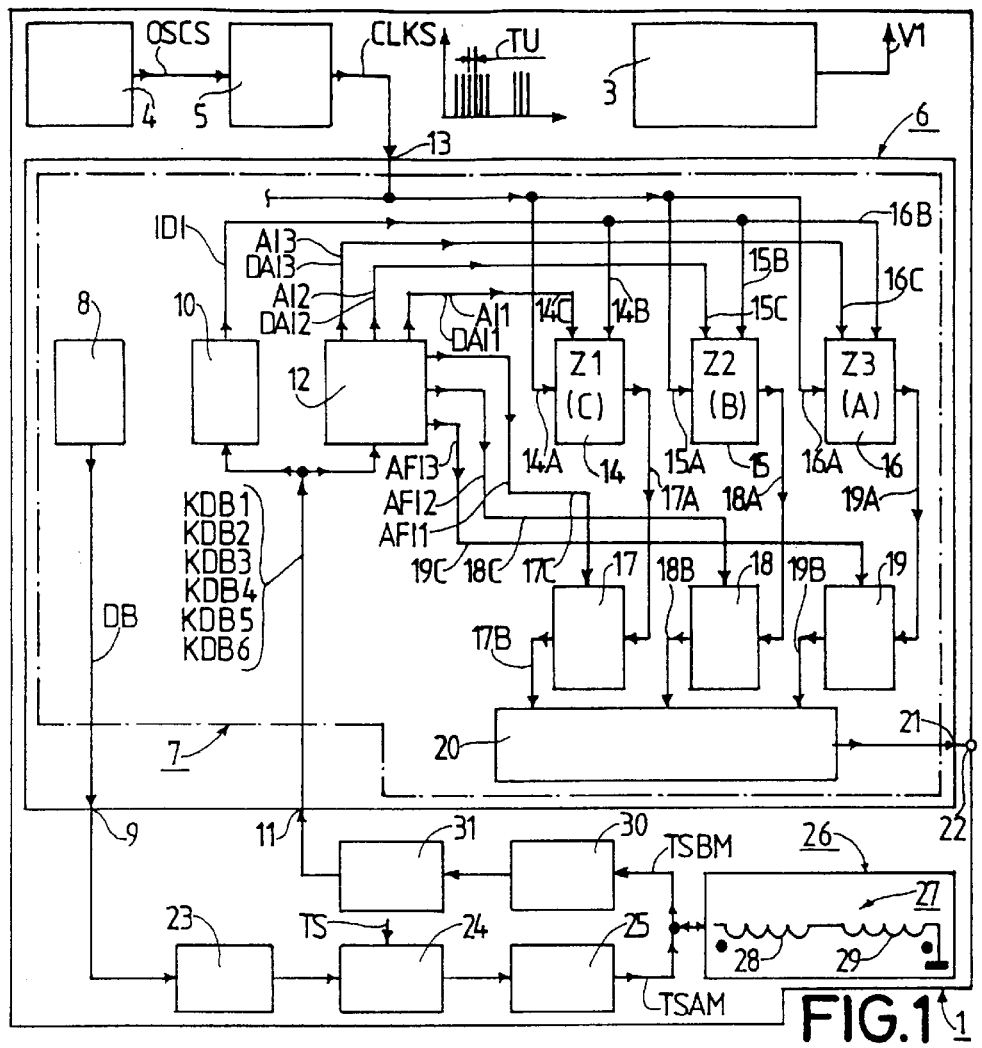
FIG. 1 is a block diagram which diagrammatically shows a communication device in accordance with a first embodiment of the invention.
Figure 2:
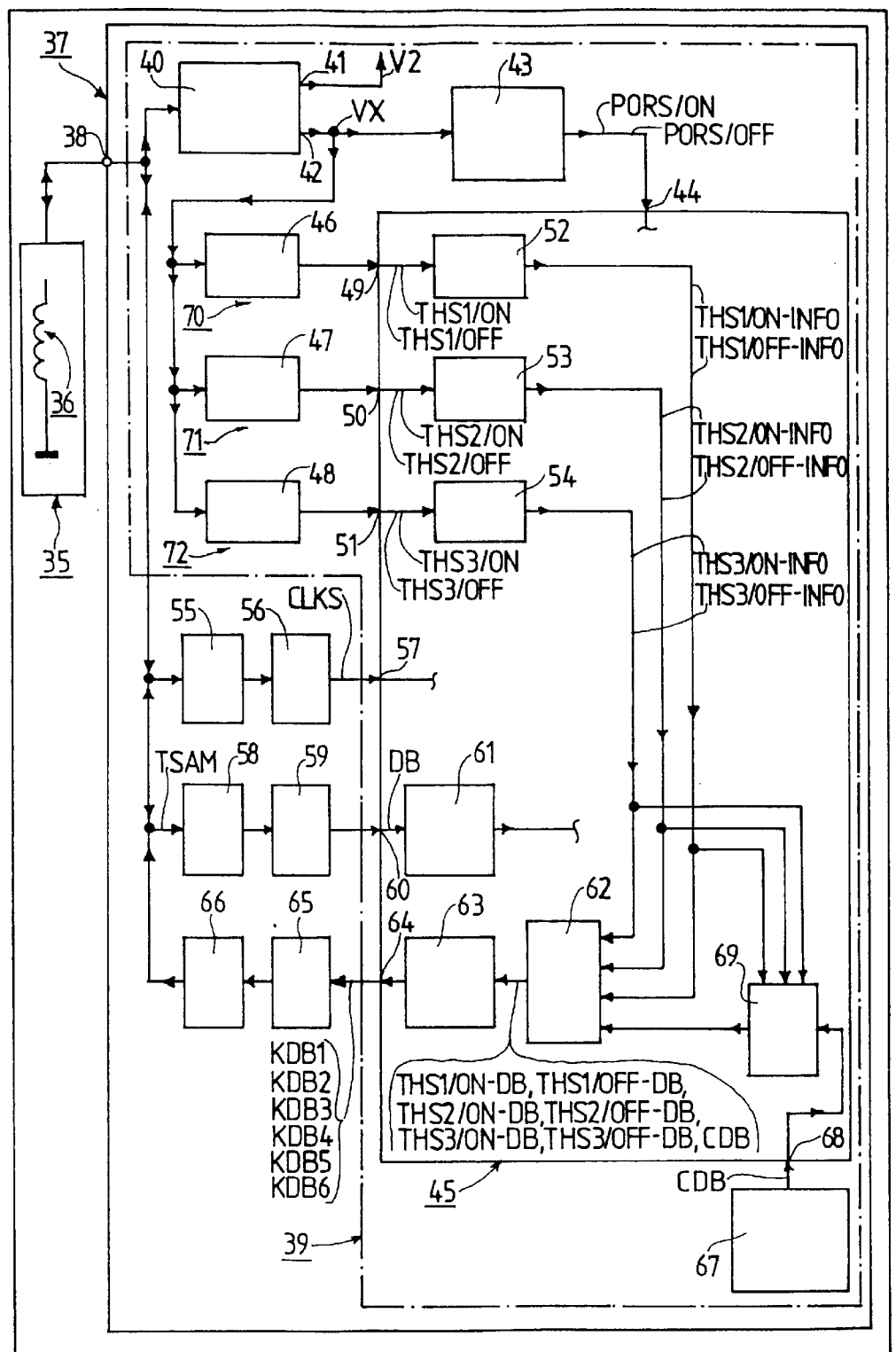
FIG. 2 is a block diagram which diagrammatically shows a transponder in accordance with an embodiment of the invention, adapted to cooperate with the communication device shown in FIG. 1.

FIG. 1 shows elements of a communication device 1 which are relevant in the present context. The communication device 1 is adapted to provide contactless communication with a suitable transponder 2 constructed accordingly. FIG. 2 shows elements of the transponder 2 which are relevant in the present context. The construction of the transponder 2 will be described in greater detail hereinafter. The construction of the communication device 1 will be described in greater detail directly below.

The communication device 1 includes voltage supply means 3 by means of which a d.c. supply voltage V1 can be generated to power the various elements of the communication device 1, but this is not illustrated in FIG. 1.

The communication device 1 further includes an oscillator 4 for generating an oscillator signal OSCS. In the present case the oscillator signal OSCS has a frequency of 13.56 MHz. However, this frequency may alternatively have a value of 125 kHz. The oscillator 4 is followed by a divider 5 by means of which a frequency division can be performed, the divider thus enabling a clock signal CLKS to be derived from the oscillator signal OSCS, which clock signal is shown in FIG. 1. The clock signal CLKS comprises clock pulses which are spaced at time intervals TU from one another. In the present context this time interval TU forms a unit of time TU.

The communication device 1 further includes a microcomputer 6 by means of which a multitude of means and functions are realized but of which only the relevant elements and functions will be described in greater detail hereinafter.

Between the transponder 2 and the communication device 1 a communication connection can be established which starts at a starting instant TB (see the fourth and lowermost diagram in FIG. 3), from which starting instant TB the transponder 2 has a communication connection with the communication device 1 for a communication time interval CP. Once such a communication connection has started the communication connection with the transponder 2 can be terminated, as a result of which the transponder 2 no longer has the communication connection with the communication device 1 upon the termination of the communication connection, which is effected at the ending instant TE.

The communication device 1 includes determining means, which enable at least one characteristic value relating to the communication between the communication device 1 and the transponder 2 to be determined. In the present case said determining means are advantageously formed by time value determining means 7 realized by means of the microcomputer 6. The time value determining means 7 are adapted to determine three time values A, B and C, of which each of the time values A, B and C represents a respective part PCP3, PCP2 or PCP1 of the communication time interval CP which starts at the starting instant TB and which ends at the ending instant TE, as can be seen in the second, the third and the fourth diagram in FIG. 3.

In the present case the time value determining means 7 comprise data block generating means 8, with the aid of which different data blocks DB can be generated. The data blocks DB generated with the aid of the data block generating means 8 can be transferred to an output 9 of the microcomputer 6.

The time value determining means 7 further include identification means 10 with the aid of which it is possible to establish the identity of any transponder that is in contactless communication with the communication device 1, i.e. also of the transponder 2 shown in FIG. 2. The identification means 10 are connected to an input 11 of the microcomputer 6.

The time value determining means 7 further include data block detection means 12, which are likewise connected to the input 11 of the microcomputer 6. With the aid of the data block detection means 12 data blocks DB applied to the input 11 can be detected.

The microcomputer 6 has a further input 13, to which the clock signal CLKS from the divider 5 can be applied. In the microcomputer 6 the clock signal CLKS is used for clocking purposes, which will not be described in any further detail.

The time value determining means 7 further include a first time value determining stage 14, a second time value determining stage 15 and a third determining stage 16. The first time value determining stage 14 is formed by a first counting stage 14. The second time value determining stage 15 is formed by a second counting stage 15. The third time value determining stage 16 is formed by a third counting stage 16. Each of the three counting stages 14, 15 and 16 can be activated and deactivated, as will be set forth hereinafter. After activation each of the three counting stages 14, 15 and 16 enables a numerical value C, B and A to be determined as the time value C, B and A, which numerical value represents the number of consecutive times that the given time unit TU has elapsed, which time unit TU is defined by the clock signal CLSK, which can be applied to the three counting stages 14, 15 and 16 via connections 14A, 15A and 16A.

The time value determining means 7 further include first read-out means 17, second read-out means 18 and third read-out means 19. With the aid of the three read-out means 17, 18 and 19 it is possible to read out the time value A, B or C, which represents at least a part of the communication time interval CP and which is determined by means of the associated counting stage 14, 15 or 16, respectively between the activation and the deactivation of this counting stage 14, 15 or 16. For this purpose, each of the counting stages 14, 15 and 16 is connected to the associated read-out means 17, 18 or 19 via a respective connection 17A, 18A or 19A.

The time value determining means 7 also include calculation means 20 to which the time values A, B and C read out of the counting stages 14, 15 and 16 by the read-out means 17, 18 and 19 can be applied, namely via connections 17B, 18B and 19B. With the aid of the calculation means 20 it is possible to calculate three time intervals PCP1, PCP2 and PCP3, which each form a part PCP1, PCP2 or PCP3 of the communication time interval CP from the three time values A, B and C, which each represent a part PCP3, PCP2 and PCP1 of the communication time interval CP. The calculation means 20 can further calculate three position values D3, D2 and D1 from the three time values A, B and C, which position values each represent the physical position of the transponder 2 with respect to the communication device 1, which position is essentially occupied by the transponder 2 at the end of the part PCP3, PCP2 or PCP1 of the communication time interval CP, as represented by the measured time value A, B or C, respectively.

Figure 3:
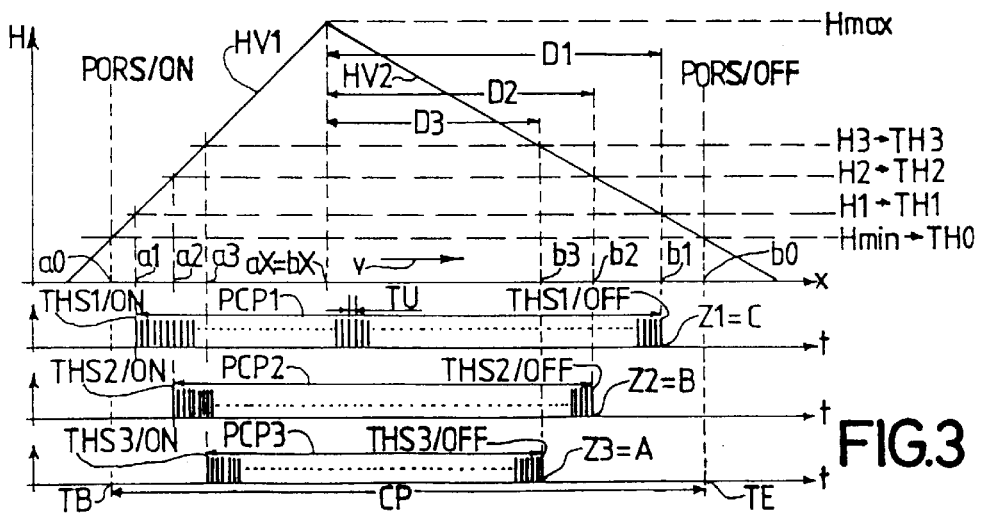
FIG. 3 shows four diagrams below one another, including one field strength diagram and three time diagrams which represent the occurrence of counting pulses in the communication device shown in FIG. 1.

It is to be noted that the transponder 2 is movable along a path of movement x (see the first and uppermost diagram in FIG. 3). By means of a transport device, not shown, for example by means of a conveyor belt driven with an essentially constant speed of movement, the transponder 2 is movable past the communication device 1 with a given speed of movement v. In the present context this is important because the calculation means 20 can calculate the three position values D1, D2 and D3 representing the physical position of the transponder 2 with respect to the communication device 1 from the three time values A, B and C and the speed of movement v of the transponder 2. With the aid of the three position values D1, D2 and D3 it is thus possible in a simple manner to determine the instantaneous position of the transponder 2 in relation to the communication device 1, i.e. the instantaneous position of the transponder 2 situated on the conveyor belt and moved with the speed of movement v by means of the conveyor belt. This is important and advantageous, for example, when the transponder is attached to a piece of luggage moved with the aid of the conveyor belt because the position of the relevant piece of luggage on the conveyor belt can then be determined accurately with the aid of the transponder 2 and the piece of luggage can subsequently be transferred to desired destinations of a conveyor belt configuration in a highly reliable manner. This is for example very advantageous and important in the case of the luggage handling by means of conveyor belt at airports.

The data calculated with the aid of the calculation means 20 can be transferred to an output 22 of the communication device 1 via an output 21 of the microcomputer 6. From the output 22 of the communication device 1 the calculated data can be transferred to, for example, a host computer in order to start the corresponding processes and functions in this host computer.

The communication device 1 further includes encoding means 23 connected to the output 9 of the microcomputer 6 and enabling the data blocks DB generated by the data block generating means 8 to be encoded. Modulation means 24 are connected to the encoding means to receive the encoded data blocks and to modulate an unmodulated carrier signal TS in accordance with the encoded data blocks. In the present case this is effected by amplitude modulation of the unmodulated carrier signal TS. The modulation means 24 supply an amplitude modulated carrier signal TSAM. The modulation means 24 are connected to an amplifier 25 by means of which the amplitude modulated carrier signal TSAM is amplified.

The communication device 1 further includes transmitting/receiving means 26 arranged to receive the amplitude modulated carrier signal TSAM amplified by means of the amplifier 25. The transmitting/receiving means 26 include matching means and a transmission coil configuration 27 arranged to receive the amplified and amplitude modulated carrier signal TSAM via the matching means, not shown. The transmission coil configuration 26 comprises a first transmission coil 28 and a second transmission coil 29. The two transmission coils 28 and 29 are arranged in series. The two transmission coils 28 and 29 having opposite winding directions, as is indicated in known manner with the aid of dots near the coils in FIG. 1.

The transmission coil configuration 27 of the communication device 1 enables a transmission magnetic field to be generated whose field strength varies as shown diagrammatically in the uppermost diagram of FIG. 3. The transmission magnetic field has a field strength which, along the path of movement x for the transponder 2, first increases to a maximum field strength value and subsequently decreases from the maximum field strength value.

The communication device 1 further has demodulation means 30 connected to the transmitting/receiving means 26. The demodulation means 30 can demodulate a load-modulated carrier signal TSBM. The load-modulated carrier signal TSBM is formed in that the modulation means 24 apply the unmodulated carrier signal TS to the transmitting/receiving means 26 via the amplifier 25 and the transponder 2 effects a load modulation of the unmodulated carrier signal TS in dependence on data blocks encoded at the transponder side, as a result of which the load-modulated carrier signal TSBM is presented to the demodulation means 30.

The communication device 1 further has decoding means 31 connected to the demodulation means 30 and enabling the still encoded data blocks supplied by the demodulation means 30 to be decoded, thus enabling the decoded data blocks DB to be applied from the decoding means 31 to the input 11 of the microcomputer 1.

The construction of the transponder 2 will be described in detail hereinafter.

The transponder 2 shown in FIG. 2 includes transmitting/receiving means 35. The transmitting/receiving means 35 include a transmission coil configuration 36 which is formed by a single transmission coil and which inductively cooperates with the transmission coil configuration 27 of the communication device 1, as a result of which the contactless communication between the communication device 1 and the transponder 2 is achieved in a transformer-like fashion.

The transponder 2 includes a circuit 37 having a terminal 38 to which the transmitting/receiving means 35 are connected. The circuit 37 is realized in integrated circuit technology.

The circuit 37 has support means 39 with whose support at least one characteristic value relating to the communication between the communication device 1 and the transponder 2 can be determined. In the present case, the support means 39 of the circuit 37 are advantageously adapted to assist in determining the three time values A, B and C, which each represent a respective part PCP3, PCP2 or PCP1 of the communication time interval CP which starts at the starting instant TB and which ends at the ending instant TE.

The circuit 37 of the transponder 2 includes voltage generating means 40, which are connected to the terminal 38 of the circuit 37 and by means of which a supply voltage V2 can be generated using the carrier signals TS and TSAM transmitted to the transponder 2. The various parts of the circuit 37 of the transponder 2 can be energized by means of the d.c. supply voltage V2, which appears at a first output 41 of the voltage generating means 40.

The voltage generating means 40 have a second output 42. At the second output 42 a voltage VX appears, which corresponds to the field strength H which can be received by means of the transmission coil configuration 36 of the transponder 2 and which is plotted in the first and uppermost diagram in FIG. 3. When the field strength H received by means of the transmission coil configuration 36 has a low value a low voltage VX will appear at the second output 42. Conversely, when the received field strength H has a high value a high voltage VX will appear at the second output 42.

The circuit 37 of the transponder 2 further includes a so-called power-on reset stage 43. The power-on reset stage 43 represents an above-threshold detection means 43 by means of which it is possible to detect that the transponder 2, which is moved along the path of movement x, has reached an above-threshold location a0 where the field strength H received by the transmission coil configuration 36 of the transponder 2 has exceeded a given threshold value Hmin, by means of which it is possible to detect that the voltage VX at the second output 42 of the voltage generating means 40 has exceeded a threshold value TH0. As soon as the voltage VX has exceeded the threshold value TH0 the power-on reset stage supplies a control signal PORS/ON. When the afore-mentioned threshold value TH0 is subsequently no longer reached, the power-on reset stage 43 supplies a corresponding control signal PORS/OFF. The control signals PORS/ON and PORS/OFF can be applied to an input 44 of a microcomputer 45.

The circuit 37 of the transponder 2 includes the microcomputer 45 just mentioned, by means of which a multitude of means and functions are realized but of which only those means and functions are described which are relevant in the present context.

The circuit 37 of the transponder 2 further has a first voltage comparator 46, a second voltage comparator 47 and a third voltage comparator 48. The three voltage comparators 46, 47 and 48 all have an input connected to the second output 42 of the voltage generating means 40, as a result of which the voltage VX appearing at the second output 42 of the voltage generating means 40 can be applied to inputs of the voltage comparators 46, 47 and 48. The first voltage comparator 46 makes it possible to compare the voltage VX applied to it with a first voltage threshold value TH1. Likewise, the second voltage comparator 47 enables a comparison with a second voltage threshold value TH2 to be made. Similarly, the third voltage comparator 48 enables a comparison with a third voltage threshold value TH3 to be made. When the voltage VX exceeds the first voltage threshold value TH1, the first voltage comparator 46 outputs a first control signal THS1/ON. When the voltage VX subsequently decreases below the first voltage threshold value TH1, the first voltage comparator 46 supplies a second control signal THS1/OFF. Likewise, the second voltage comparator 47 supplies a third control signal THS2/ON when the voltage VX exceeds the second voltage threshold value TH2. When the voltage VX subsequently decreases below the second voltage threshold value TH2 the second voltage comparator 47 supplies a fourth control signal THS2/OFF. Similarly, the third voltage comparator 48 supplies either a fifth control signal THS3/ON or a sixth control signal THS3/OFF in relation to the third voltage threshold value TH3. The two control signals THS1/ON and THS1/OFF can be applied to a first control input 49 of the microcomputer 45. The two control signals THS2/ON and THS2/OFF can be applied to a second control input 50 of the microcomputer 45. The two control signals THS3/ON and THS3/OFF can be applied to a third control input 51 of the microcomputer 45.

The first control voltage detection means 52, the second control voltage detection means 53 and the third control voltage detection means 54 are realized with the aid of the microcomputer 45. The first control voltage detection means 52 are connected to the first control input 49. The second control voltage detection means 53 are connected to the second control input 50. The third control voltage detection means 54 are connected to the third control input 51. The first control voltage detection means 52 can generate and supply first control information THS1/ON-INFO and second control information THS1/OFF-INFO in accordance with the two control signals THS1/ON and THS1/OFF applied to the first control voltage detection means 52. Similarly, the second control voltage detection means 53 can generate and supply third control information THS2/ON-INFO and third control information THS2/OFF-INFO. Similarly, the third control voltage detection means 54 can generate and supply fifth control information THS3/ON-INFO and sixth control information THS3/OFF-INFO.

It is to be noted that the first voltage comparator 46 and the first control voltage detection means 52 together form first above-threshold detection means 70, which in the present case also form below-threshold detection means. The first above-threshold detection means 70 make it possible to detect that the transponder 2 which moves along the path of movement x has reached a first above-threshold location a1 where the field strength H received by the transmission coil configuration 36 of the transponder 2 has exceeded a first field strength threshold value H1 and where a voltage VX at the second output 42 of the voltage generating means 40, at which a voltage VX appears which corresponds to the field strength H received by means of the transmission coil configuration 36 of the transponder 2, has exceeded a given first voltage threshold value TH1. With the aid of the first above-threshold detection means 70, which also form first below-threshold detection means, it is further possible to detect that the transponder 2 which moves along the path of movement x has reached a first below-threshold location b1 where the field strength H received by the transmission coil configuration 36 of the transponder 2 has decreased below said first field strength threshold value H1 and where said voltage VX at the second output 42 has become smaller than said given first voltage threshold value TH1.

The second voltage comparator 47 and the second control voltage detection means 53 together form second above-threshold detection means 71, which also form second below-threshold detection means. The second above-threshold detection means 71 make it likewise possible to detect that a second above-threshold location d2 and a second below-threshold location b2 are reached, which locations are defined by a second field strength threshold value H2 and that the voltage VX exceeds and decreases below a second voltage threshold value TH2.

The third voltage comparator 48 and the third control voltage detection means 54 together form third above-threshold detection means 72, which also form second below-threshold detection means. The third above-threshold detection means 72 make it likewise possible to detect that a third above-threshold location a3 and a third below-threshold location b3 are reached, which locations are defined by a third field strength threshold value H3 and that the voltage VX exceeds and decreases below a third voltage threshold value TH3.

The circuit 37 of the transponder 2 further includes clock signal regeneration means 55 connected to the terminal 38 of the circuit 37 and enabling a clock signal to be regenerated from the carrier signals TS and TSAM transmitted to the transponder 2. The clock signal regeneration means 55 are followed by a divider 56, at whose output a clock signal CLKS appears, which can be applied to the input 57 of the microcomputer 45. The clock signal CLKS is used as time base in the microcomputer 45, but this is not shown information FIG. 2.

The circuit 37 of the transponder 2 further includes demodulation means 58, which are also connected to the terminal 38 of the circuit 37. In the present case, the demodulation means 58 are formed by amplitude demodulation means. The demodulation means 58 are capable of demodulating the amplitude-modulated carrier signal TSAM transmitted from the communication device 1 to the transponder 2. The demodulated output signal of the demodulation means 58 can be applied to decoding means 59, with the aid of which the applied demodulated output signal can be decoded, as a result of which the decoding means 59 can apply decoded data blocks DB to an input 60 of the microcomputer 45.

The decoded data blocks DB can be applied to data block detection means 61 realized by means of the microcomputer 45. The data block detection means 61 are adapted to detect the data blocks DB applied to them and to supply control information corresponding to the detected data blocks DB, but this will not be described in any further detail.

The microcomputer 45 of the circuit 37 of the transponder 2 also forms data block generating means 62 to which the control information THS1/ON-INFO, THS1/OFF-INFO, THS2/ON-INFO, THS2/OFF-INFO, THS3/ON-INFO and THS3/OFF-INFO supplied by the control voltage detection means 52, 53 and 54 can be applied. Depending on the afore-mentioned control information the data block generating means 62 can generate the following control data blocks, namely the control data blocks THS1/ON-DB, THS1/OFF-DB, THS2/ON-DB, THS2/OFF-DB, THS3/ON-DB and THS3/OFF-DB. The afore-mentioned control data blocks generated by means of the data block generating means 62 can be applied to data block output means 63 realized by means of the microcomputer 45, from which data output means said control data blocks can be applied to an output 64 of the microcomputer 45.

The circuit 37 of the transponder 2 further has encoding means 65 connected to the output 64 of the microcomputer 45 and enabling the data blocks DB generated by the data block generating means 62 and supplied by the data block output means 63 to be encoded. As a result, data blocks encoded by the encoding means 65 can be supplied.

The circuit 37 of the transponder 2 further includes modulation means 66 connected to the terminal 38 of the circuit 37 of the transponder 2. With the aid of the modulation means 66 a signal which corresponds to an unmodulated carrier signal TS and which appears in the transmission coil configuration 36 can be subjected to a load modulation in dependence on the encoded data blocks, as a result of which a load modulated carrier signal TSBM in accordance with said load modulation can be generated in the communication device 1 owing to the inductive coupling between the transmission coil configuration 36 of the transponder 2 and the transmission coil configuration 27 of the communication device 1.

The circuit 37 of the transponder 2 further includes a memory 67 which stores a plurality of data blocks. The memory 67 inter alia stores an identity data block CDB, which defines the identity of the transponder 2. The memory 67 is connected to a terminal 68 of the microcomputer 45. The microcomputer 45 has its terminal 68 connected to read-out means 69 realized by means of the microcomputer 45 and enabling the identity data block CDB to be read out of the memory 67 and the identity data block CDB thus read out to be applied to the data block generating means 62.

Hereinafter, the operation of the communication device 1 and of the transponder 2 in conjunction with a method of determining the three time values A, B and C representing a part of the communication time interval CP is described in detail, for which reference is made not only to FIGS. 1 and 2 but also to FIG. 3.

It is assumed that the transponder 2 is moved along the path of movement x with a constant speed of movement v and is thus moved past the communication device 1. When the transponder 2 reaches the above-threshold location a0, this is detected by the power-on reset stage 43, as a result of which this stage supplies the control signal PROS/ON to the input 44 of the microcomputer 45, which causes the entire circuit 37 of the transponder 2 to be activated.

When the transponder 2 subsequently reaches the first above-threshold location a1 this is detected with the aid of the above-threshold detection means 70, as a result of which the first control voltage detection means 52 of the first above-threshold detection means 70 supply the first control information THS1/ON-INFO to the data block generating means 62 and the read-out means 69. As a result of this, the data block generating means 62 generate the first control data block THS1/ON-DB and the read-out means 69 read the identity data block CDB out of the memory 67 and apply it to the data block generating means 62. Thereupon, the first control data block THS1/ON-DB and the identity data block CDB are combined to a first combined data block KDB1, which is applied to the data block output means 63. This, in its turn, causes the first combined data block KDB1 to be encoded with the aid of the encoding means 65, after which the encoded data block is applied to the modulation means 66 for the load modulation of the unmodulated carrier signal TS, which results in a contactless transmission to the communication device 1.

In the communication device 1 the load-modulated carrier signal TSBM is demodulated with the aid of the demodulation means 30 and subsequently the encoded data blocks obtained after the demodulation are decoded, as a result of which the decoding means 31 transfer the first combined data block KDB1 to the input 11 of the microcomputer 6.

The first combined data block KDB1 thus made available in the microcomputer 6 is applied both to the identification means 10 and to the data block detection means 12. The identification means 10 detect the identity data block CDB, as a result of which the identification means 10 generate and supply identity information IDI characteristic of the transponder 2. This identity information IDI is applied to the three counting stages 14, 15 and 16 via connections 14B, 15B and 16B, as a result of which the three counting stages 14, 15 and 16 have information which indicates that a counting process to be carried out upon reception of the identity information IDI should be performed for the transponder 2 characterized by the identity information IDI.

The first combined data block KDB1 is also applied from the input 11 of the microcomputer 6 to the data block detection means 12, as already stated. The data block detection means 12 detect the first control data block THS1/ON-DB, as a result of which the data block detection means 12 supply first activation information AI1 to the first counting stage 14 via a connection 14C, which results in the first counting stage 14 being activated. This starts a counting process in which the successively appearing pulses of the clock signal CLKS are counted, which clock signal is applied to the first counting stage 14 via a connection 14D.

As stated hereinbefore, the data block detection means 12 are adapted to detect the first control data block THS1/ON-DB, which is generated in response to the first control information THS1/ON-INFO generated with the aid of the first above-threshold detection means 70. Thus, the data block detection means 12 form above-threshold detection means with which it is possible to detect that the transponder 2 which is moved along the path of movement x has reached the first above-threshold location a1, where the field strength H received by the transmission coil configuration 36 of the transponder 2 has exceeded the first field strength threshold value H1 and where the voltage VX at the second output 42 of the voltage generating means 40 has exceeded the first voltage threshold value TH1.

A process which is wholly similar to the process described hereinbefore takes place when the transponder 2, as it moves along the path of movement x, reaches the second above-threshold location a2. The second above-threshold detection means 71 then generate the third control information THS2/ON-INFO, as a result of which a second combined data block KDB2 is generated, which consists of the third control data block THS2/ON-DB and the identity data block CDB. Subsequently, the identity data block CDB is identified with the aid of the identification means 10, after which the identity information IDI is applied to the three counting stages 14, 15 and 16. Furthermore, the data block detection means 12, which also form the above-threshold detection means, generate second activation information AI2, which is applied to the second counting stage 15 via a connection 15C, after which the second counting stage 15 counts the clock pulses appearing in the clock signal CLSK applied to this stage via the connection 15A.

A process which is wholly similar to the process described hereinbefore takes place when the transponder 2, as it moves along the path of movement x, reaches the third above-threshold location a3. As a result of this, the third above-threshold detection means 72 generate the fifth control information THS3/ON-INFO and supply this to the data block generating means 62 and to the read-out means 69, as a result of which a third combined data block KDB3 is generated, which consists of the third fifth data block THS3/ON-DB and the identity data block CDB. The third combined data block KDB3 is transferred to the communication device 1 and is applied to the identification means 10 and the data block detection means 12. Subsequently, the identification means 10 supply the identity information IDI which characterizes the transponder 2, which information is again applied to the three counting stages 14, 15 and 16 via the connections 14B, 15B and 16B. The data block detection means 12, which also form third above-threshold detection means, detect the fifth control data block THS3/ON-DB, as a result of which the data block detection means 12 generate third activation information AI3, which is applied to the third counting stage 16 via a connection 16C. As a result of this, the third counting stage 16 is activated to perform a counting process in which it counts the clock pulses appearing in the clock signal CLSK applied to this stage via the connection 16A.

When the transponder 12, as it moves along the path of movement x, reaches the third below-threshold location b3, this results in the third above-threshold detection means 72, which also form third below-threshold detection means, supply the sixth control information THS3/OFF-INFO to the data block generating means 62 and to the read-out means 69. As a result of this, the data block generating means 62 generate the sixth control data block THS3/OFF-DB and the read-out means 69 read the identity data block CDB out of the memory 67 and apply it to the data block generating means 62, upon which the data block generating means generate a sixth combined data block KDB6, which includes the sixth control data block THS3/OFF-DB and the identity data block CDB. The sixth combined data block KDB6 is transmitted to the communication device 1 and applied to the identification means 10 and to the data block detection means 12. The identity data block CDB is identified with the aid of the identification means 10, after which the identification means 10 supply the identity information IDI in a manner already described.

The data block detection means 12 further detect the sixth control data block THS3/OFF-DB generated as a result of the third below-threshold location b3 being reached. Thus, the data block detection means 12 also form third below-threshold detection means, with the aid of which it is possible to detect that the transponder 2, which moves along the path of movement x, has reached the third below-threshold location b3, where the field strength H received by the transmission coil configuration 36 of the transponder 2 has decreased below the third field-strength threshold value H3 and where the voltage VX at the second output 42 of the voltage generating means 42 has decreased below the third voltage threshold value TH3. As soon as the data block detection means 12 have detected the sixth control data block THS3/OFF-DB the data block detection means 12 generate third deactivation information DAI3 and transfer this to the third counting stage 16 via the connection 16C, as a result of which the third counting stage 16 is deactivated. This terminates the counting process performed by means of the third counting stage 16. It is now assumed that the count Z3 of the third counting stage 16 has the value Z3=A at the instant of deactivation of the third counting stage 16. This count A represents a time value A, which is representative of the part PCP3 of the communication time interval CP.

As soon as the data block detection means 12 detect the sixth control data block THS3/OFF-DB they also generate third read-out information AFI3, which is applied to the third read-out means 19 via a connection 19C. As a result of this, the third read-out means 19 read out the count Z3=A of the third counting stage 16 and apply it to the calculation means 20.

When the transponder 2, as it moves along the path of movement x, reaches the second below-threshold location b2 a process wholly similar to the process described hereinbefore is carried out. In the this case, the fourth control information THS2/OFF-INFO is generated with the aid of the second above-threshold detection means 71, which also form second below-threshold detection means, as a result of which a fifth combined data block KDB5 is generated with the aid of the data block generating means 62, which combined data block consists of the fourth control data block THS2/OFF-DB and the identity data block CDB. The fifth combined data block KDB5 is transmitted to the communication device 1, where it is processed. During this processing the data block detection means 12, which also form second below-threshold detection means, detect the fourth control data block THS2/OFF-DB, as a result of which the data block detection means 12 generate second deactivation information DAI2 and second read-out information AFI2. The second deactivation information DAI2 is applied to the second counting stage 15 via the connection 15C, which causes the second counting stage 15 to be deactivated. It is assumed that the count Z2 of the second counting stage 15 is B at the instant of deactivation. The count Z2=B represents a time value B, which is representative of the part PCP2 of the communication time interval CP. The second read-out information AFI2 is applied to the second read-out means 18 via a connection 18C, as a result of which the second read-out means 18 read the count Z2=B out of the second counting stage 15 and apply this count to the calculation means 20.

When the transponder 2, as it moves along the path of movement x, reaches the first below-threshold location b1 a process wholly similar to the process described hereinbefore is carried out. In the this case, the second control information THS1/OFF-INFO is generated with the aid of the first above-threshold detection means 70, which also form first below-threshold detection means, as a result of which a fourth combined data block KDB5 is generated with the aid of the data block generating means 62, which combined data block consists of the second control data block THS1/OFF-DB and the identity data block CDB. The fourth combined data block KDB4 is also transmitted to the communication device 1 and is processed in the communication device 1. During this processing the data block detection means 12, which also form first below-threshold detection means, detect that the second control data block THS1/OFF-DB has been received, as a result of which the data block detection means 12 generate first deactivation information DAI1 and first read-out information AFI1. The first deactivation information DAI1 is applied to the first counting stage 14 via the connection 14C, which causes the first counting stage 14 to be deactivated. It is assumed that the count Z1 of the first counting stage 14 is C at the instant of deactivation. The count Z1=C represents a time value C, which is representative of the part PCP1 of the communication time interval CP.

The first read-out information AFI1 is applied from the data block detection means 12 to the first read-out means 17 via a connection 17C. As a result of this, the first read-out means 17 read the count Z1=C out of the second counting stage 14 and apply this count to the calculation means 20.

When the transponder 2, as it moves along the path of movement x of the transponder 2, reaches the below-threshold location b0, this causes the power-on reset stage 43 to generate the control signal PORS/OFF and supply this to the input 44 of the microcomputer 45. As a result of this, the microcomputer 45 and, consequently, the entire circuit 37 of the transponder 2 are rendered inoperative.

By means of the processes described hereinbefore three time values A, B and C have been determined, i.e. in the form of the counts Z3, Z2 and Z1 of the three counting stages 14, 15 and 16. The three time values A, B and C have been read out with the aid of the read-out means 17, 18 and 19 and have been transferred to the calculation means 20. This means that the time values A, B and C are available in the calculation means 20.

Using the three time values A, B and C the calculation means 20 calculate three time intervals PCP3, PCP2 and PCP1, which each form a part of the communication time interval CP. This calculation is effected by means of the three following equations:

$$PCP3 = (A-1) \cdot TU \tag{1}$$

$$PCP2 = (B-1) \cdot TU \tag{2}$$

$$PCP1 = (C-1) \cdot TU \tag{3}$$

In the above equations TU is the time unit defined by means of the clock signal CLKS. The factors (A-1), (B-1) and (C-1) result from the fact that only (A-1), (B-1) and (C-1) time units TU appear between A, B and C counting pulses, respectively.

In addition, the calculation means 20 calculate the physical positions of the transponder 2 with respect to the communication device 1, which is effected with the aid of the three time values A, B and C and the speed of movement v of the transponder 2. For the time being, this calculation is made using the following equations (4) to (15):

$$PCP3 = T(aX - a3) + T(b3 - bX) \quad (4)$$

$$bX = aX \quad (5)$$

$$T(aX - a3) = k \cdot T(b3 - bX) \quad (6)$$

$$PCP3 = k \cdot T(b3 - bX) + (b3 - bX) \quad (7)$$

$$PCP3 = (k + 1) \cdot T(b3 - bX) \quad (8)$$

$$T(b3 - bX) = \left(\frac{1}{k+1}\right) \cdot PCP3 \quad (9)$$

$$T(b3 - bX) = \left(\frac{1}{k+1}\right) \cdot (A - 1) \cdot TU \quad (10)$$

$$v_T = v \quad (11)$$

$$D3 = b3 - bX = v \cdot T(b3 - bX) \quad (12)$$

$$D3 = v \cdot \left(\frac{1}{k+1}\right) \cdot TU \cdot (A - 1) \quad (13)$$

$$D2 = v \cdot \left(\frac{1}{k+1}\right) \cdot TU \cdot (B - 1) \quad (14)$$

$$D1 = v \cdot \left(\frac{1}{k+1}\right) \cdot TU \cdot (C - 1) \quad (15)$$

Hereinafter, the calculation of the three position values D3, D2 and D1 by means of the above equations (1) to (15) is described in detail.

As is apparent from the first and uppermost diagram and from the fourth and lowermost diagram in FIG. 3, the time interval PCP3 is made up of two time intervals, namely the time interval T(aX–a3), which elapses when the transponder 2 moves from the third above-threshold location a3 to the location aX corresponding to the maximum field strength Hmax, and the time interval T(b3–bX), which elapses when the transponder 2 moves from the location bX assigned to the maximum field strength Hmax to the third below-threshold location b3. The above situation is defined in the equation (4).

The two locations aX and bX are identical, as is defined in equation (5).

In the present case it is assumed that the field strength H received or receivable by the transponder 2 has a field strength variation composed of two linear field strength variations HV1 and HV2. However, it is to be borne in mind that the field strength variation need not necessarily be linear but that it is quite possible to apply curved field strength variations. However, there is always a mathematically definable relationship between the geometries. In the present case, the relationship is defined in the equation (6), in which k is a constant based on the two field strength variations HV1 and HV2.

Inserting the equation (6) into the equation (4) yields the equation (7). The equation (8) readily follows from the equation (7). The equation (9) readily follows from the equation (8).

Inserting the equation (1) into the equation (9) yields the equation (10). The equation (10) is an equation for the calculation of the time T(b3–bX) which elapses when the transponder 2 moves from the location bX to the third below-threshold location b3.

As stated, the transponder 2 moves with a speed of movement $v_T=v$, as is defined in the equation (11). The speed of movement v is constant and may be, for example, a few m/s.

The physical position D3 of the transponder 2 with respect to the communication device 1 is given by the distance between the two locations b3 and bX, which distance is defined by the product of the speed of movement v and the time T(b3=bX) elapsing during the movement of the transponder 2 between the two locations bX and b3, as is expressed in the equation (12).

Inserting the equation (10) into the equation (12) yields the equation (13) for the physical position D3. As is apparent from the equation (13) the physical position D3 of the transponder 2 relative to the communication device 1 can be calculated with the aid of the time value A, the time unit TU, the speed of movement v and a constant factor $$\left(\frac{1}{k+1}\right).$$

Likewise, the physical position D2 can be determined with the aid of the equation (14) and the physical position D1 of the transponder 2 can be determined with the aid of the equation (15).

With the aid of the three physical positions D1, D2 and D3 a very accurate determination of the position is possible using mathematical averaging methods, so that the position of the position of the transponder 2 relative to the communication device 1 can be determined in a very accurate manner.

Hereinafter, the communication device 1 in accordance with the second embodiment as well as the transponder 2 in accordance with the second embodiment are described in detail with reference to FIGS. 4, 5 and 6. Parts of the first embodiment of the communication device 1 already described with reference to FIG. 1 and of the transponder 2 already described with reference to FIG. 2 will no longer be described separately.

Figure 4:
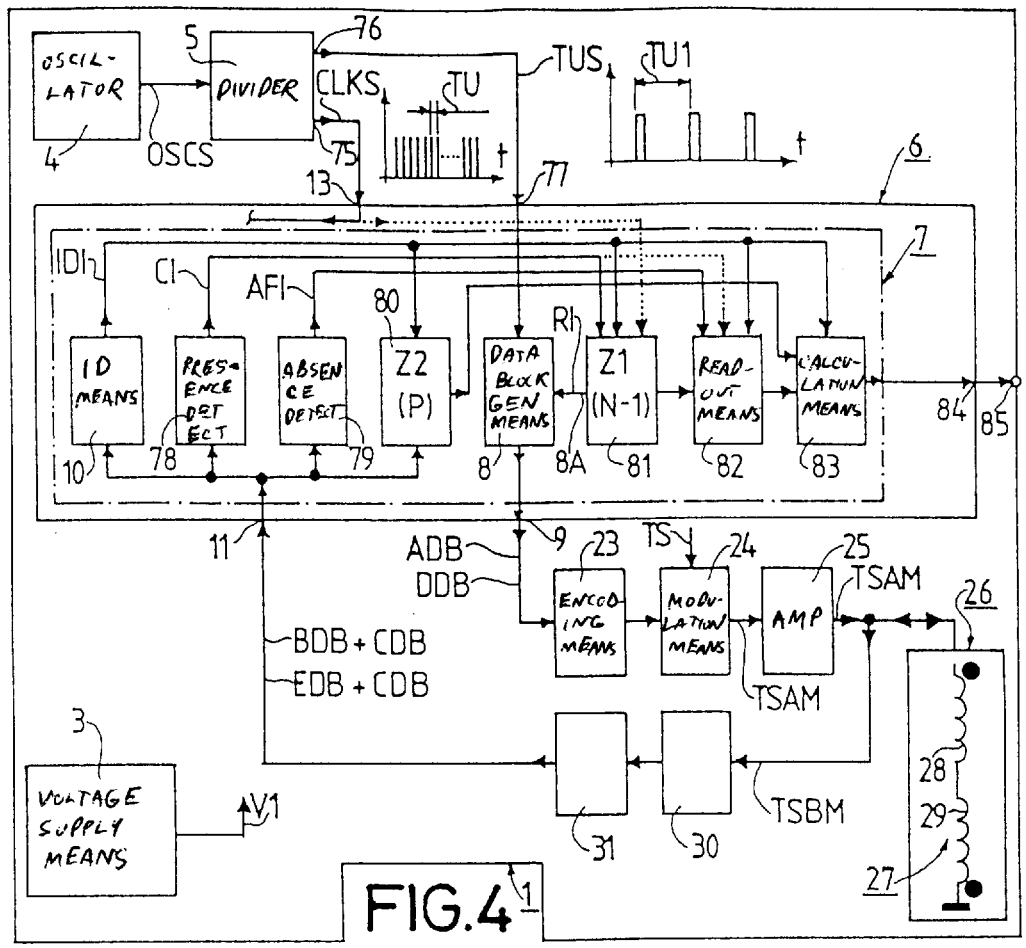
FIG. 4 shows, in a manner similar to FIG. 1, a communication device in accordance with a second embodiment of the invention.

In the communication device 1 shown in FIG. 4 the divider 5 has not only a first output 75, which corresponds to the output of the divider 5 of the communication device 1 of FIG. 1 and to which the divider 5 supplies the clock signal CLKS whose clock pulses are spaced at a time interval corresponding to the first time unit TU, but has also a second output 76 to which the divider 5 supplies a time unit signal TUS whose pulses are spaced at a time interval corresponding to a second time unit TU1. The time unit signal TUS appearing on the second output 76 of the divider 5 can be applied to a further input 77 of the microcomputer 6.

Also in this case data block generating means 8 are realized with the aid of the microcomputer 6. The data block generating means 8 can generate a series of data blocks, of which in the present context only a request data block ADB and a read-out data block DDB are mentioned.

Furthermore, identification means 10 are realized by means of the microcomputer 6, which identification means can identify an identity data block CDB and, after identification of an identity data block, can generate identity information IDI.

Moreover, presence detection means 78 are realized with the aid of the microcomputer 6. The presence detection means 78 can detect the appearance of an answer data block BDB, which can be generated by means of the transponder 2 shown in FIG. 5 when the transponder 2 has entered into communication with the communication device 1 and is consequently present in a communication range between the communication device 1 and the transponder 2. Thus, it is to be noted that with the aid of the presence detection means 78 it is possible to detect that the transponder 2 shown in FIG. 5 has entered into communication with the communication device 1 shown in FIG. 4 and is consequently present within a communication range between the communication device 1 and the transponder 2. When such an answer data block BDB is detected the presence detection means 78 can generate a counting pulse CI.

Furthermore, absence detection means 79 are realized with the aid of the microcomputer 6. The absence detection means 79 make it possible to detect the absence of an answer data block BDB, which is the case when the transponder 2 is no longer in communication and has consequently left the communication range. Thus, it is to be noted that with the aid of the absence detection means 79 it is possible to detect that the transponder 2 is no longer in communication with the communication device 1 and is consequently not present within the communication range. When the absence detection means 79 detect the absence of an answer data block BDB, the absence detection means generate read-out information AFI.

Moreover, decoding and storage means 80 are realized with the aid of the microcomputer 6, with the aid of which means a count data block EDB, which can be generated by the transponder 2 shown in FIG. 2, can be decoded, as a result of which a count Z2 transmitted to the communication device 1 with the aid of the count data block EDB is obtained, which is buffered in the decoding and storage means 80.

The microcomputer 6 also forms an activable and deactivable time-value determining stage 81, which is constituted by a counting stage 81. The time-value determining stage 81 is connected to the presence detection means 78 via a connection 81A, as a result of which the counting pulses CI can be applied to the time-value determining stage 81. After the detection that the transponder 2 has entered into communication with the communication device 1 the counting pulses CI generated and supplied with the aid of the presence detection means 78 are applied to the time-value determining stage 81, as a result of which this stage 81 is activated and counting of the counting pulses CI is started. After the detection that the transponder 2 is no longer in communication with the communication device 1, no more answer data block BDB is received and consequently no more counting pulse CI is generated in the first place, as a result of which the time-value determining stage 81 stops counting and is consequently deactivated, and in the second place read-out means 82 can be activated by means of the read-out information AFI supplied by the absence detection means 79, which will be described in greater detail hereinafter.

After its activation and when a transponder 2 is present within the communication range the time-value determining stage 81 makes it possible to determine a time value (N-1), which represents a time interval TT elapsed after the activation. In the present case the time-value detection means stage 81 is formed by a counting stage 81, by means of which a count Z1 corresponding to the determined time value (N-1) can be determined. After its activation the activable and deactivable time-value determining stage 81 can determine as time value (N-1) a numerical value (N-1) which represents the number of times that a given time unit, i.e. the second time unit TU1, elapses, which will be described in greater detail hereinafter.

The microcomputer 6 further forms read-out means 82 with the aid of which the time value (N-1) between the activation and the deactivation of the time-value determining stage 81, determined by means of this stage 81, can be read out, which time value represents a part TT of the communication time interval CP.

Figure 5:
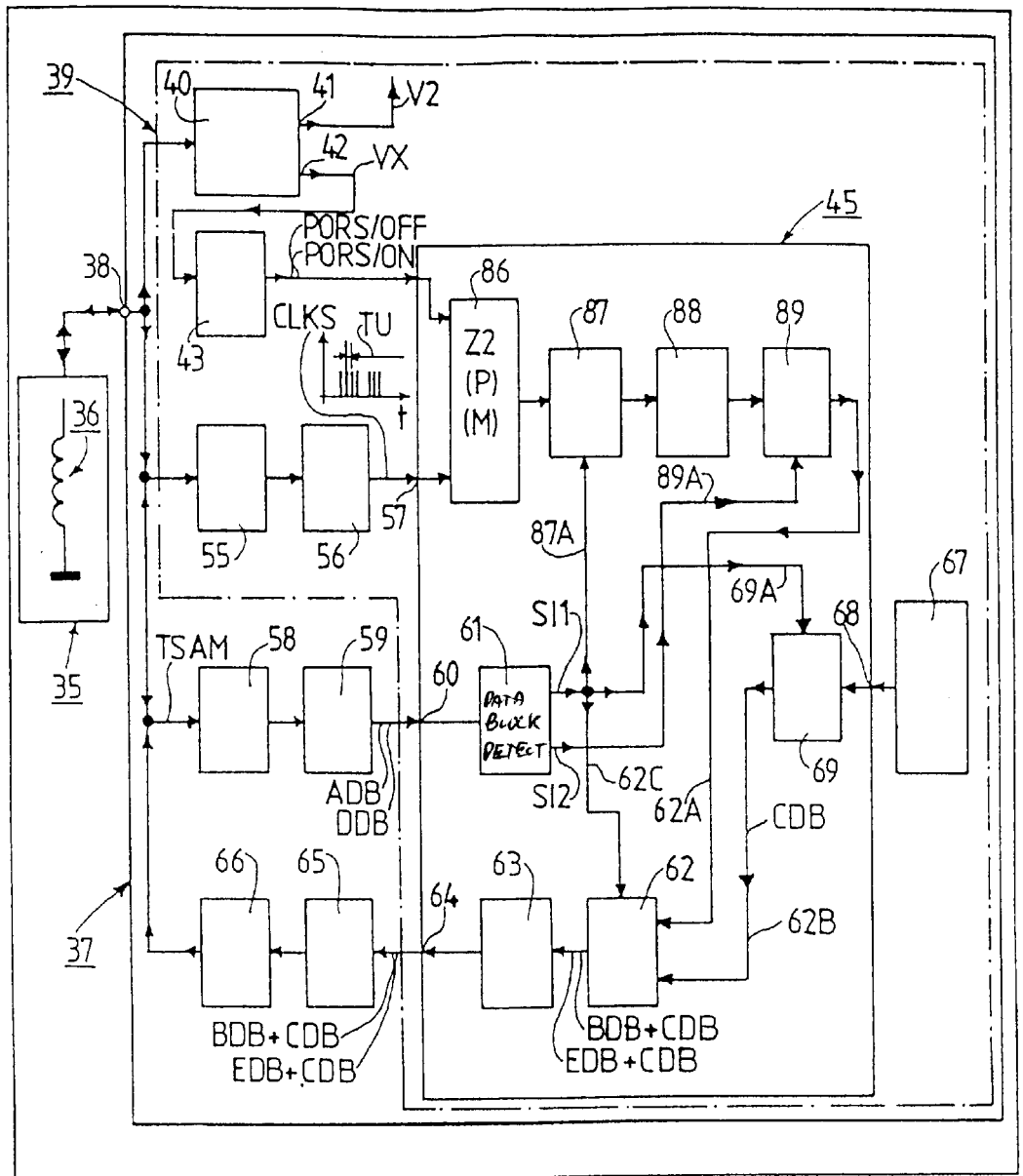
FIG. 5 shows, in a manner similar to FIG. 2, a transponder in accordance with a second embodiment of the invention, adapted to cooperate with the communication device shown in FIG. 4.

The microcomputer 6 also forms calculation means 83 with the aid of which the communication time interval CP and a position value D can be calculated, which position value represents the physical position of the transponder 2 of FIG. 5 in relation to the communication device 1 of FIG. 4 occupied by the transponder 2 substantially at the end of the communication time interval CP represented by the relevant time values P and (N-1) which have been determined. The results of the calculation means 83 can be applied to an output 85 of the communication device 1 via an output 84 of the microcomputer 6, from which output 85 the results can be applied, for example, to a host computer.

With regard to the transponder 2 of FIG. 5, the following details are to be noted, which are different as compared with the transponder of FIG. 2.

In the transponder 2 shown in FIG. 5 the power-on reset stage 43 also forms presence detection means with the aid of which it is possible to detect that the transponder 2 has entered into communication with the communication device 1 shown in FIG. 4 and is consequently present in a communication range between the communication device 1 and the transponder 2. The power-on reset stage 43 also forms absence detection means with the aid of which it is possible that the transponder 2 is no longer in communication with the communication device 1 and is consequently no longer within the communication range. As soon as the transponder 2, as it moves along the path of movement x (see the first and uppermost diagram in FIG. 6), reaches the above-threshold location x1, the power-on reset stage 43 supplies the control signal PORS/ON. When subsequently, as the movement of the transponder 2 along the path of movement x proceeds, the transponder 2 reaches the below-threshold location x3, the power-on reset stage 43 supplies the control signal PORS/OFF. As long as the transponder 2 is situated between the above-threshold location x1 and the below-threshold location x3 the transponder 2 is within the communication range between the communication device 1 and the transponder 2.

In the transponder 2 shown in FIG. 5 the support means 39 include a time-value determining stage 86 realized by means of the microcomputer 45. The control signals PORS/ON and PORS/OFF can be applied to the time-value determining stage 86 via the input 44 of the microcomputer 45. The time-value determining stage 86 can be activated by means of the control signal PORS/ON. The time-value determining stage 86 can be deactivated by means of the control signal PORS/OFF. By means of the time-value determining stage 86 it is possible, after it has been activated and when a transponder 2 is within the communication range, to determine a count Z2 which corresponds to a time value P representative of a time interval TP which has elapsed after the activation.

The time-value determining stage 86 is formed by a counting stage 86 which can be activated and deactivated and, after activation, enables a numerical value P to be determined as the time value P, which numerical value represents the number of consecutive times that a given time unit TU has elapsed. For this purpose, the clock signal CLSK supplied by the divider 56 can be applied to the time-value determining stage 86, i.e. the counting stage 86, via the input 57 of the microcomputer 45.

Figure 6:
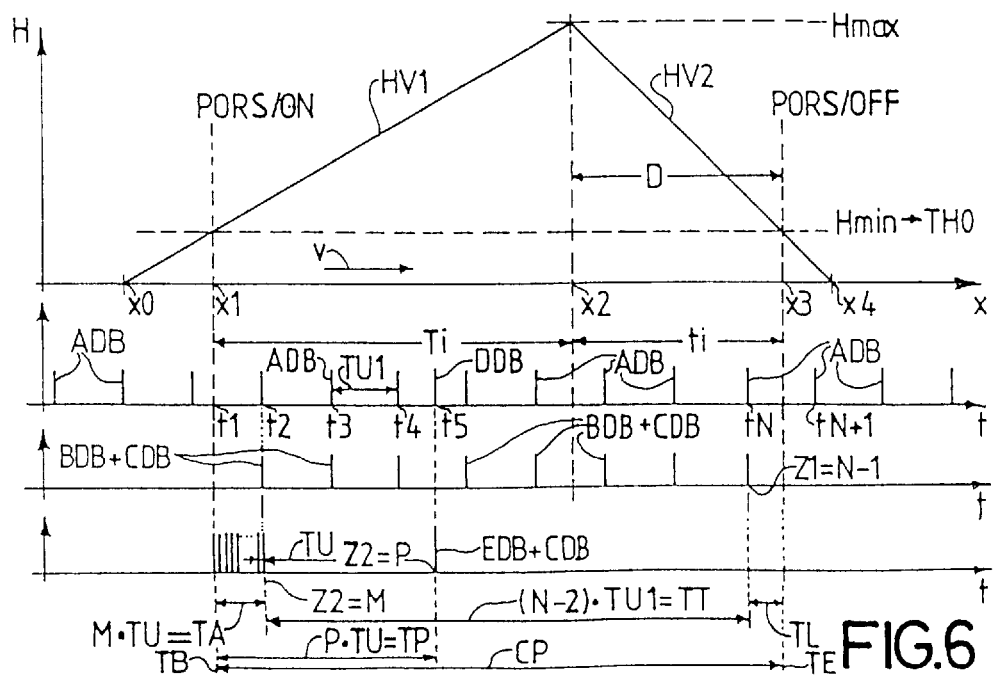
FIG. 6 shows, in a manner similar to FIG. 3, four diagrams below one another, including one field strength diagram and three time diagrams which represent the occurrence of counting pulses in the communication device shown in FIG. 4 and in the transponder shown in FIG. 5.

The microcomputer 45 further forms second read-out means 87 with the aid of which it is possible to read out the time value P, determined by the time-value determining stage 86 between the activation and deactivation of this stage 86 and representing the part TP of the communication time interval CP, as is apparent from the fourth and lowermost diagram in FIG. 6. The second read-out means 87 can be controlled by means of the data block detection means 61 via a connection 87A, as will be described in greater detail hereinafter.

After the time value P determined by means of the time-value determining stage 86 has been read out with the aid of the second read-out means 87 the time value P can be stored in a buffer memory 88 realized by means of the microcomputer 45. The buffered time value P can be retrieved from the buffer memory 88 with the aid of third read-out means 89, which are also realized with the aid of the microcomputer 45. The third read-out means 89 can be controlled by means of the data block detection means 61 via a connection 89A, as will be described in greater detail hereinafter.

The time value P retrieved from the buffer memory 88 with the aid of the third read-out means 89 can be applied to the data block generating means 62 via a connection 62A. Moreover, the identity data block CDB, which can be read out of the memory 67 with the aid of the first read-out means 69, can be applied to the data block generating means 62 via a connection 62B.

It is be noted also that the data block generating means 62 can be controlled with the aid of the data block detection means 61 via a connection 62C and that the first read-out means 69 can be controlled with the aid of the data block detection means 61 via a connection 69A, which will also be described in greater detail hereinafter.

Hereinafter, the operation of the communication device 1 shown in FIG. 4 and of the transponder 2 shown in FIG. 5 will be described in detail in conjunction with a method of determining the two time values P and (N-1), which each represent a respective part TP or TT of the communication time interval CP, the description being clarified with reference to FIG. 6, besides FIGS. 4 and 5.

It is assumed that the transponder 2 moves along the path of movement x with a constant speed of movement v (for this, see the first and uppermost diagram in FIG. 6) and moves past the communication device 1.

In the communication device 1 the time unit signal TUS is applied to the input 77 of the microcomputer 6 in uninterrupted succession, as a result of which this time unit signal TUS, which contains the second time unit TU1, is applied to the data block generating means 8 in uninterrupted succession. Upon each pulse of the time unit signal TUS the data block generating means 8 generate a request data block ADB (see the second diagram in FIG. 6). Each generated request data block ADB is encoded with the aid of the encoding means 23, after which with the aid of the modulation means 24 a carrier signal TSAM is generated, which is amplitude-modulated in accordance with the relevant request data block ADB and which is applied to the transmission coil configuration 27 of the communication device 1 via the amplifier 25.

As long as the transponder 2, which moves along the path of movement x, is still situated before the above-threshold location x1 the transponder 2 is still inactive, as a result of which the transponder 2 does not respond to the amplitude-modulated carrier signal TSAM applied to the transmission coil configuration 27 of the communication device 1.

As soon as the transponder 2 has reached the above-threshold location x1, this results in the power-on reset stage 43, which also forms the presence detection means 78, detecting the presence of the transponder 2 in the communication range between the communication device 1 and the transponder 2 and consequently supplying the control signal PORS/ON. As a result of this, the microcomputer 45 of the circuit 37 of the transponder 2 is activated and, consequently, the entire circuit 37 of the transponder 2 is activated.

First of all, this causes the counting stage 86 of the transponder 2 to be activated, as a result of which the counting stage 86 starts to count the pulses of the clock signal CLKS, as is apparent from the second diagram and the fourth and lowermost diagram in FIG. 6. Secondly, it causes the next read-out data block ADB generated by the data block generating means 8 of the communication device 1 at the instant t2—which gives rise to an amplitude-modulated carrier signal TSAM, which is transmitted to the transponder 2 by means of the transmission coil configuration 27 and 36 and is demodulated with the aid of the demodulation means 58 in the transponder 2, after which the read-out data block ABD is reconstructed with the aid of the decoding means 59—to be detected with the aid of the data block detection means 61 of the transponder 2.

The detection of the transmitted read-out data block ADB causes the data block detection means 61 to supply first control information SI1, which is applied to the second read-out means 87, the first read-out means 69 and the data block generating means 62 via the connections 87A, 69A and 62C. As a result of this, the second read-out means 87 read out the count Z2 appearing in the counting stage 86 at the instant t2, which count Z2=M (see the fourth and lowermost diagram in FIG. 6). The count M thus read out is buffered in the buffer memory 88. In the first read-out means 69 the first control information SI1 causes the identity data block DCB to be read out of the memory 67 and to be applied to the data block generating means 62 via the connection 62B. Via the connection 62C the control information SI1 further causes the data block generating means 62 to generate an answer data block BDB in response to the received read-out data block ADB. At the instant t2 the data block generating means 62 further derive from the generated answer data block BDB and the applied identity data block DCB a first combined data block BDB+CDB (see second and first diagram in FIG. 6), which is applied to the encoding means 65 with the aid of the data block output means 63. The encoding means 65 effect encoding, after which the modulation means 66 of the transponder 2, which are adapted to effect a load modulation, are energized and effect a load modulation of the unmodulated carrier signal TS, which load modulation is demodulated with the aid of the demodulation means 30 of the communication device 1, after which decoding is effected with the aid of the decoding means 31, as a result of which the decoding means 31 supply the first combined data block BDB+CDB to the input 11 of the microcomputer 6 of the communication device 1.

Subsequently, the identity data block CDB is identified with the aid of the identification means 10, after which the identification means 10 supply the identity information IDI, namely to the decoding and storage means 80, to the time-value determining stage 81, i.e. to the counting stage 81, to the read-out means 82 and to the calculation means 83. In this way it is achieved that the decoding and storage means 80, the time-value determining stage 81, the read-out means 82 and the calculation means 83 allocate the operations performed by them to the transponder 2 characterized by the identity information IDI and thus by the identity data block CDB.

Furthermore, the presence detection means 78 detect the presence of an answer data block BDB and, consequently, the presence of the transponder 2 within the communication range, which causes the presence detection means 78 to generate a clock pulse CI at the instant t2 and supply it to the counting stage 81, as a result of which the count Z1=1 is reached.

The process described above is subsequently repeated at the instants t3 and t4. Thus, at the instant t3 the count Z2 of the counting stage 86 of the transponder 2 is read out with the aid of the read-out means 87 and is buffered with the aid of the buffer memory 88. Moreover, the count Z1 of the counting stage 81 in the communication device 1 is incremented by a further clock pulse CI at the instant t3, as a result of which the count Z1=2 is reached.

At the instant t4 the count Z2=P then available in the counting stage 86 of the transponder 2 is read out and is buffered with the aid of the buffer memory 88. Moreover, the count Z1 of the counting stage 81 in the communication device 1 is incremented by 1 at the instant t4, as a result of which the count Z1=3 is reached.

As soon as the counting stage 81 has reached the count Z1=3, the counting stage 81 supplies start information RI to the data block generating means 8 via a connection 8A. The start information RI causes the generation of a read-out data block DBD to be started with the aid of the data block generating means 8 at the instant t5, as is shown in the second diagram in FIG. 6. The read-out data block DBD is subsequently transmitted to the transponder 2 and is detected by the data block detection means 61, as a result of which the data block detection means 61 generate second control information S12. The second control information S12 is applied to the third read-out means 89 via the connection 89A, as a result of which the count Z2=P buffered in the buffer memory 88 is read out and is applied to the data block generating means 62 via the connection 62A. In accordance with the count Z2=P applied to it the data block generating means 62 generate a count data block EDB. The generated count data block EDB is combined with the identity data block CDB, which is already available in the data block generating means 62, so as to form a second combined data block EDB+CDB. The second combined data block EDB+CDB is supplied to the encoding means 65 with the aid of the data block output means 63, which subsequently results in the second combined data block EDB+CDB being transmitted to the communication device 1.

In the communication device 1 the second combined data block EDB+CDB is applied to the input 11 of the microcomputer 6, after which the identity data block CDB is evaluated with the aid of the identification means 10 and the count data block EDB is processed with the aid of the decoding and storage means 80, which finally results in the count Z2=P corresponding to the count data block EDB being stored in the decoding and storage means 80 (see the fourth and lowermost diagram in FIG. 6).

Subsequently, the next read-out data block ADB (see second diagram in FIG. 6) is generated in the communication device 1 and is transmitted to the transponder 2, as a result of which the transponder 2 generates the next combined data block BDB+CDB and transmits it to the communication device 1 (see third diagram in FIG. 6). As a result of this, the count Z2 of the counting stage 86 is read out again with the aid of the read-out means 87 and is buffered in the buffer memory 88, but this is not utilized in the subsequent process. Moreover, it causes the count Z1 of the counting stage 81 in the communication device 1 to be incremented.

The above process of generating a read-out data block ADB and of evaluating an answer data block BDB is subsequently continued, namely up to the instant tN (see the second and the third diagram in FIG. 6).

After the instant tN the transponder 2 reaches the below-threshold location x3 and, once this location is reached, the power-on reset stage 43 produces the control signal PORS/OFF, which causes the microcomputer 45 and, consequently, the entire circuit 37 of the transponder 2 to be rendered inoperative. Consequently, the transponder 2 can no longer respond to the read-out data block ADB generated at the instant tN+1, as a result of which the transponder 2 no longer supplies an answer data block ADB at the instant tN+1 (see the second and the third diagram in FIG. 6).

The absence detection means 79 in the communication device 1 detect the absence of an answer data block DBD at the instant tN+1, as a result of which the absence detection means 79 generate the read-out information AFI and apply it to the read-out means 82. As a consequence, the read-out means 82 read the instantaneous count Z1 of the counting stage 81. This count Z1 has been reached at the instant tN and is (N-1). The read-out count Z1=N-1 is applied to the calculation means 83 with the aid of the read-out means 82.

In the present case the calculation means 83 include internal read-out means by which, upon receipt of the count Z1=N-1 from the counting stage 81, can also read out the count Z2=P buffered in the decoding and storage means 80 and can be made available to the calculation means 83.

Thus, as a result of the processes described hereinbefore the two counts (N-1) and P are available in the calculation means 83 after the instant tN+1, which counts each represent a respective time value (N-1) or P representative of respective part TT or TP of the communication time interval CP.

By means of the two afore-mentioned time values (N-1) and P the calculation means 83 can calculate said parts TT and TP of the communication time interval CP, i.e. the time intervals TT and TP. Moreover, a position value D can be calculated using the time values (N-1) and P and the time intervals TT and TP, respectively. For the time being the following equations (16) to (31) are given for these calculations:

$$CP = TA + TT + TL \tag{16}$$

$$TL = 0 \tag{17}$$

$$CP = TA + TT \tag{18}$$

$$TP = TA + 2 \cdot TU1 \tag{19}$$

$$TP = P \cdot TU \tag{20}$$

$$TA = P \cdot TU - 2 \cdot TU1 \tag{21}$$

$$TT = (N - 2) \cdot TU1 \tag{22}$$

$$CP = P \cdot TU - 2 \cdot TU1 + (N - 2) \cdot TU1 \tag{23}$$

$$CP = P \cdot TU + (N - 4) \cdot TU1 \tag{24}$$

$$CP = Ti + ti \tag{25}$$

$$Ti = c \cdot ti \tag{26}$$

$$CP = (c + 1) \cdot ti \tag{27}$$

$$ti = \left(\frac{1}{c+1}\right) \cdot CP \tag{28}$$

$$v_T = v \tag{29}$$

$$D = x3 - x2 = v \cdot ti \tag{30}$$

$$D = v \cdot \left(\frac{1}{c+1}\right) \cdot [P \cdot Tu + (N-4) \cdot TU1] \qquad (31)$$

The calculation of the time intervals TA, TP, TT and CP as well as the position value D is described in greater detail hereinafter on the basis of the equations (16) to (31) given above.

As is apparent from the fourth and lowermost diagram in FIG. 6, the whole communication time interval CP is made up of three parts, as defined in the equation (16). The last-mentioned part TL cannot be determined accurately by means of the present method, because in this case this part is assumed to be zero, as is defined in the equation (17). The inaccuracy caused by making the part TL zero depends on the length of the second time unit TU1 and can be kept small enough by a suitable choice of the frequency. Thus, by applying the equation (17) to the equation (16) the equation (18) is obtained.

As is further apparent from the fourth and lowermost diagram in FIG. 6, the time interval TP is made up of two parts, namely the time interval TA and twice the second time unit TU1, which can be attributed to the fact that the count Z2=P has been determined after the instant t4, when the count Z1 of the counting stage 81 was Z1=3, which represents two time units TU1.

The time interval TP can be calculated with the aid of the time value P that has been determined and the time unit TU, namely by means of the equation (20).

The equation (21) can simply derived from the equation (19) using the equation (20) and enables the time interval TA to be calculated with the aid of the calculation means 83 using the two time units TU and TU1 and the count Z2=P that has been determined.

As is further apparent from the second and the fourth diagram in FIG. 6, the time interval TT consists of (N-2) second time units TU1, as defined in the equation (22). Thus, the calculation means 83 can calculate the time interval TT with the aid of the equation (22).

Inserting the equations (21) and (22) into the equation (18) simply yields the equation (23). Likewise, the equation (24) can simply be derived from the equation (23). Thus, the entire communication time interval CP can be calculated with the aid of the equation (24) but the time interval TL is then ignored. For this calculation the appropriate time value (N-4) is calculated from the time value (N-1) which has been determined.

The whole communication time interval CP is made up of two time intervals Ti and ti, as is apparent from the first and uppermost diagram and the second diagram in FIG. 6 and is defined in the equation (25). The time interval Ti elapses when the transponder 2 moves from the above-threshold location x1 up to the location x2 that corresponds to the maximum field strength Hmax. The time interval ti elapses when the transponder 2 moves from the location x2 that corresponds to the maximum field strength Hmax to the below-threshold location x3.

On the basis of the geometry of the variation of the field strength H which is received or can be received by the transponder 2 and which can be seen in the first and uppermost diagram in FIG. 6, it follows that between the time intervals Ti and ti the mathematical relationship in accordance with the equation (26) exists, in which c is a constant based on the two field strength variations HV1 and HV2.

Inserting the equation (26) into the equation (25) yields the equation (27), from which the equation (28) is obtained in a simple manner.

As stated, the transponder 2 moves with a speed of movement $v_T=v$, as is defined in the equation (29).

The physical position D of the transponder 2 with respect to the communication device 1 is given by the distance between the two locations x3 and x2, which distance is determined by the product of the speed of movement v and the time ti that expires during the movement of the transponder 2 between the two locations x2 and x3, as is defined in the equation (30).

Inserting the equations (28) and (24) into the equation (30) directly yields the equation (31) for the physical position D. As is apparent from the equation (31) the physical position D of the transponder 2 relative to the communication device 1 can be calculated with the aid of the time value P and the time value (N-1), from which previously the time value (N-4) is calculated, and the two time units TU and TU1, the speed of movement v and a constant factor $$\left(\frac{1}{k+1}\right).$$

Finally, it is to be noted that the description of the two examples explained hereinbefore is based on the simplification that only a single transponder 2 is in communication with the relevant communication device 1, which assumption has been made to avoid an unnecessarily long and intricate description. It is obvious that in practice a plurality of transponders 2 communicate simultaneously with the relevant communication device 1, but this does not pose any problems because each transponder 2 can readily be identified with the aid of the identity data block CDB stored in its memory 67, as a result of which all the processes and operations are allocated to the respective identified transponder 2.

The invention is not limited to the two examples described hereinbefore. For example, as a modification to the embodiment in accordance with the first example an embodiment as defined in the claims 6, 29, 30, 37 and 38 may be realized, where instead of three counting stages in the communication device three such stages have been provided in the transponder, whose counts, which each represent a time value, are transmitted to a communication device as data blocks, in which device they are applied to calculation means. As a modification to the embodiment in accordance with the second example, it is also possible to realize an embodiment in which a communication device includes a counting stage formed with the aid of a microcomputer and adapted not to count a second time unit TU1 but to count the first time unit TU, the clock signal CLKS then being applied to this counting stage, as is illustrated in FIG. 4 by means of a dotted line.

What is claimed is:

1. A method of determining at least one characteristic value (A, B, C; (N-1), P) relating to the communication between a communication device (1) and a transponder (2), which are adapted to communicate with one another in a contactless manner, in which the transponder (2) enters into a communication connection with the communication device (1), which connection starts at a starting instant (TB), and in which the transponder (2) has the communication connection with the communication device (1) for a communication time interval (CP) which starts at the starting instant (TB), wherein at least one time value (A, B, C; (N-1), P) is determined as at least one characteristic value (A, B, C; (N-1), P), which time value represents at least a part (PCP3, PCP2, PCP1; TT, TP) of the communication time interval (CP) which starts at the starting instant (TB);

wherein the transponder (2) enters into the communication connection with the communication device (1) and has the communication connection with the communication device (1) for a communication time interval (CP) which starts at the starting instant (TB), and in which the transponder (2) subsequently exits from the communication connection existing with the communication device (1), which connection ends at an ending instant (TE), and no longer has the communication connection with the communication device (1) as from the ending instant (TE);

wherein at least one time value (A, B, C; (N-1), P) is determined as at least one characteristic value (A, B, C; (N-1), P), which time value represents at least a part (PCP3, PCP2, PCP1; TT, TP) of the communication time interval (CP) which starts at the starting instant (TB) and which ends at the ending instant (TE); and wherein the transponder (2) moves along a path of movement (x), and a transmission magnetic field is generated with the aid of a transmission coil configuration (27) of the communication device (1), which transmission magnetic field has a field strength variation which, along the path of movement (x) for the transponder 2, first increases to a maximum field strength value and subsequently has a field strength variation which decreases from the maximum field strength value, and in a method step it is detected that the transponder (2) which moves along the path of movement (x) has reached an above-threshold location (a1, a2, a3) where the field strength (H) received by a transmission coil configuration (36) of the transponder (2) has exceeded a given field-strength threshold value (H1, H2, H3), and after the detection that the transponder (2) has reached the above-threshold location (a1, a2, a3), in a further method step, a time-value determining means (14, 15, 16) is activated, and a time value (C, B, A) is determined, which time value is representative of a time interval (PCP1, PCP2, PCP3) which elapses after the activation, and subsequently, in a further method step, it is detected that the transponder (2) which moves along the path of movement (x) has reached a below-threshold location (b1, b2, b3) where the field strength (H) received by a transmission coil configuration (36) of the transponder (2) has decreased below said given field-strength threshold value (H1, H2, H3), and after the detection that the transponder (2) has reached the below-threshold location (b1, b2, b3), in a further method step, the time-value determining means (14, 15, 16) is deactivated, and subsequently, in a further method step, the time value determined by the time-value determining means (14, 15, 16) between the activation and the deactivation of this means (14, 15, 16) is read out, which time value is representative of at least a part (PCP1, PCP2, PCP3) of the communication time interval (CP).

2. A method as claimed in claim 1, characterized in that as time-value determining means (14, 15, 16) a counting means (14, 15, 16) is activated and deactivated, and a numerical value (C, B, A) is determined as the time value (C, B, A), which numerical value represents the number of consecutive times that a given time unit (TU) has elapsed.

3. A method as claimed in claim 2, characterized in that the counting means (14, 15, 16) for determining the numerical value (C, B, A) representative of the number of consecutive times that the given time unit (TU) has elapsed is activated in the communication device (1).

4. A method as claimed in claim 2, characterized in that the counting means for determining the numerical value representative of the number of consecutive times that the given time unit has elapsed is activated in the transponder.

5. A method of determining at least one characteristic value (A, B, C; (N-1), P) relating to the communication between a communication device (1) and a transponder (2), which are adapted to communicate with one another in a contactless manner, in which the transponder (2) enters into a communication connection with the communication device (1), which connection starts at a starting instant (TB), and in which the transponder (2) has the communication connection with the communication device (1) for a communication time interval (CP) which starts at the starting instant (TB), wherein at least one time value (A, B, C; (N-1), P) is determined as at least one characteristic value (A, B, C; (N-1), P), which time value represents at least a part (PCP3, PCP2, PCP1; TT, TP) of the communication time interval (CP) which starts at the starting instant (TB);

wherein the transponder (2) enters into the communication connection with the communication device (1) and has the communication connection with the communication device (1) for a communication time interval (CP) which starts at the starting instant (TB), and in which the transponder (2) subsequently exits from the communication connection existing with the communication device (1), which connection ends at an ending instant (TE), and no longer has the communication connection with the communication device (1) as from the ending instant (TE);

wherein at least one time value (A, B, C; (N-1), P) is determined as at least one characteristic value (A, B, C; (N-1), P), which time value represents at least a part (PCP3, PCP2, PCP1; TT, TP) of the communication time interval (CP) which starts at the starting instant (TB) and which ends at the ending instant (TE);

wherein the transponder (2) moves along a path of movement (x), and a transmission magnetic field is generated with the aid of a transmission coil configuration (27) of the communication device (1), which transmission magnetic field has a field strength variation which, along the path of movement (x) for the transponder 2, first increases to a maximum field strength value and subsequently has a field strength variation which decreases from the maximum field strength value, and in a method step it is detected that the transponder (2) has entered into the communication connection with the communication device (1) and is consequently situated within a communication range between the communication device (1) and the transponder (2), and after the detection that the transponder (2) has entered into the communication connection with the communication device (1), in a further method step, a time-value determining means (81) is activated, by means of which a time value (N-1) is determined while the transponder (2) is situated within the communication range, which time value is representative of a time interval (TT) which elapses after the activation, and subsequently, in a further method step, it is detected that the transponder (2) has exited from the communication connection with the communication device (1) and has consequently left the communication range, and after the detection that the transponder (2) has exited from the communication connection with the communication device (1), in a further method step, the time-value determining means (81) is deactivated, and subsequently, in a further method step, the time value (N-1) determined by the time-value determining means (81) between the activation and the deactivation of this means (81) is read out, which time value is representative of at least a part (TT) of the communication time interval (CP).

6. A method as claimed in claim 5, characterized in that as time-value determining means (81) a counting means (81) is activated and deactivated, and a numerical value (N-1) is determined as the time value (N-1), which numerical value is representative of the number of consecutive times that a given time unit (TU1) has elapsed.

7. A method as claimed in claim 6, characterized in that the counting means (81) for determining the numerical value (N-1) representative of the number of consecutive times that the given time unit (TU1) has elapsed is activated in the communication device (1).

8. A method as claimed in claim 6, characterized in that, in addition, a counting means (86) for determining a further numerical value (P) is activated in the transponder (2), which further numerical value is representative of the number of consecutive times that a given time unit (TU) has elapsed, the further numerical value (P) representing a further time value (P) representative of a part (TP) of the communication time interval (CP).

9. A communication device (1) which is adapted to provide contactless communication with a transponder (2) and which includes determining means (7) with the aid of which at least one characteristic value (A, B, C; (N-1), P) relating to the communication between said communication device (1) and the transponder (2) can be determined, and with which the transponder (2) can enter into a communication connection, which connection starts at a starting instant (TB), in such a manner that the transponder (2) has the communication connection with the communication device (1) for a communication time interval (CP) which starts at the starting instant (TB), wherein the determining means (7) are formed by time-value determining means (7), and the time-value determining means (7) are adapted to determine at least one time value (A, B, C; (N-1) which represents at least a part (PCP3, PCP2, PCP1; TT) of the communication time interval (CP) which starts at the starting instant (TB);

wherein the transponder (2) can enter into the communication connection and which has the communication connection starting at the starting instant (TB) of the communication connection, and with which the transponder (2) can subsequently exit from the communication connection and at the end of the communication connection, which connection ends at an ending instant (TE), no longer has the communication connection, wherein the time-value determining means (7) are adapted to determine at least one time value (A, B, C; (N-1) which represents at least a part (PCP3, PCP2, PCP1; TT, TP) of the communication time interval (CP) which starts at the starting instant (TB) and which ends at the ending instant (TE);

wherein a transmission magnetic field can be generated with the aid of a transmission coil configuration (27) of the communication device (1), which transmission magnetic field has a field strength variation which, along a path of movement (x) for the transponder (2), first increases to a maximum field strength value and subsequently has a field strength variation which decreases from the maximum field strength value, and the time-value determining means (7) include the parts mentioned hereinafter, such that above-threshold detection means (12) with the aid of which it is possible to detect that the transponder (2) which moves along the path of movement (x) has reached an above-threshold location (a1, a2, a3) where the field strength (H) received by a transmission coil configuration (36) of the transponder (2) has exceeded a given field-strength threshold value (H1, H2, H3), and a time-value determining means (14, 15, 16) which can be activated after the detection that the transponder (2) has reached the above-threshold location (a1, a2, a3) and a time value (C, B, A) can be determined, which time value is representative of a time interval (PCP1, PCP2, PCP3) which elapses after the activation, and below-threshold detection means (12) with the aid of which it is possible to detect that the transponder (2) which moves along the path of movement (x) has reached a below-threshold location (b1, b2, b3) where the field strength (H) received by a transmission coil configuration (36) of the transponder (2) has decreased below said given field-strength threshold value (H1, H2, H3), and with the aid of which, after the detection that the transponder (2) has reached the below-threshold location (b1, b2, b3), the time-value determining means (14, 15, 16) can be deactivated, and read-out means (17, 18, 19) and the time value (C, B, A) determined by the time-value determining means (14, 15, 16) between the activation and the deactivation of this means (14, 15, 16) can be read out, which time value is representative of at least a part (PCP1, PCP2, PCP3) of the communication time interval (CP).

10. A communication device (1) as claimed in claim 9, characterized in that as time-value determining means (14, 15, 16) a counting means (14, 15, 16) has been provided, which counting means can be activated and deactivated and, after its activation, a numerical value (C, B, A) can be determined as the time value (C, B, A), which numerical value represents the number of consecutive times that a given time unit (TU) has elapsed.

11. A communication device (1) as claimed in claim 9, characterized in that a transmission magnetic field can be generated with the aid of a transmission coil configuration (27) of the communication device (1), which transmission magnetic field has a field strength variation which, along a path of movement (x) for the transponder (2), first increases to a maximum field strength value and subsequently has a field strength variation which decreases from the maximum field strength value, and the time-value determining means (7) include the parts mentioned hereinafter, such that presence detection means (78) with the aid of it is possible to detect that the transponder (2) has entered into the communication connection with the communication device (1) and is consequently present within a communication range between the communication device (1) and the transponder (2), and a time-value determining means (81) which can be activated after the detection that the transponder (2) has entered into the communication connection with the communication device (1) and after its activation and while the transponder (2) is within the communication range a time value (N-1) can be determined, which time value is representative of a time interval (TT) which elapses after the activation, and which can be deactivated after the detection that the transponder (2) has exited from the communication connection with the communication device (1), and absence detection means (79) with the aid of which it is possible to detect that the transponder (2) has exited from the communication connection with the communication device (1) and is consequently not present in the communication range, and read-out means (82) with the aid of which the time value (N-1) determined by the time-value determining means (81) between the activation and the deactivation of this means (81) can be read out, which time value is representative of at least a part (TT) of the communication time interval (CP).

12. A communication device (1) as claimed in claim 11, characterized in that as time-value determining means (81) a counting means (81) has been provided, which can be activated and deactivated and after its activation a numerical value (N-1) can be determined as the time value (N-1), which numerical value represents the number of consecutive times that a given time unit (TU1) has elapsed.

13. A communication device as claimed in claim 12, characterized in that the time-value determining means (7) in addition include storage means (80) with the aid of which it is possible to store a further time value (P) determined in the transponder (2) and transmitted to the communication device (1), which further time value is representative of a part (TP) of the communication time interval (CP).

14. A transponder (2) which is adapted to provide contactless communication with a communication device (1) and which can enter into a communication connection with the communication device (1), which connection starts at a starting instant (TB), and which has the communication connection with the communication device (1) for a communication time interval (CP) which starts at the starting instant (TB), and which includes a circuit (37) having support means (39) with the aid of which at least one characteristic value (A, B, C; (N-1), P) relating to the communication between said communication device (1) and the transponder (2) can be determined, wherein the support means (39) of the circuit (37) are adapted to assist in determining at least one time value (A, B, C; (N-1), P) which represents at least a part (PCP3, PCP2, PCP1; TT, TP) of the communication time interval (CP) which starts at the starting instant (TB);

wherein the transponder (2) can enter into the communication connection with the communication device (1) and which has the communication connection with the communication device (1) starting at the starting instant (TB), and which can subsequently exit from the communication connection that exists with the communication device (1) and ends at an ending instant (TE), and which no longer has the communication connection with the communication device (1) from the ending instant (TE) onwards, wherein the support means (39) are adapted to assist in determining the at least one time value (A, B, C; (N-1); P) which represents at least a part (PCP3, PCP2, PCP1; TT, TP) of the communication time interval (CP) which starts at the starting instant (TB) and which ends at the ending instant (TE);

wherein the transponder (2) is movable along a path of movement (x) in which a transmission magnetic field can be generated with the aid of a transmission coil configuration (27) of the communication device (1), which transmission magnetic field has a field strength variation which, along the path of movement (x), first increases to a maximum field strength value and subsequently has a field strength variation which decreases from the maximum field strength value, and the support means (7) of the circuit (37) include the parts mentioned hereinafter, such that above-threshold detection means (70, 71, 72) with the aid of which it is possible to detect that the transponder (2) which moves along the path of movement (x) has reached an above-threshold location (a1, a2, a3) where the field strength (H) received by a transmission coil configuration (36) of the transponder (2) has exceeded a given field-strength threshold value (H1, H2, H3), and below-threshold detection means (70, 71, 72) with the aid of which it is possible to detect that the transponder (2) which moves along the path of movement (x) has reached a below-threshold location (b1, b2, b3) where the field strength (H) received by the transmission coil configuration (36) of the transponder (2) has decreased below said given field-strength threshold value (H1, H2, H3).

15. A transponder (2) as claimed in claim 14, characterized in that the support means of the circuit include the further parts mentioned hereinafter, such that a time-value determining means which can be activated after the detection that the transponder has reached the above-threshold location and a time value can be determined, which time value is representative of a time interval which elapses after the activation, and which can be deactivated after the detection that the transponder has reached the below-threshold location, and read-out means with the aid of which the time value determined by the time-value determining means between the activation and the deactivation of this means can be read out, which time value is representative of at least a part of the communication time interval.

16. A transponder as claimed in claim 15, characterized in that as time-value determining means a counting means has been provided, which counting means can be activated and deactivated and, after its activation, a numerical value can be determined as the time value, which numerical value represents the number of consecutive times that a given time unit has elapsed.

17. A transponder (2) which is adapted to provide contactless communication with a communication device (1) and which can enter into a communication connection with the communication device (1) which connection starts at a starting instant (TB), and which has the communication connection with the communication device (1) for a communication time interval (CP) which starts at the starting instant (TB), and which includes a circuit (37) having support means (39) with the aid of which at least one characteristic value (A, B, C; (N-1), P) relating to the communication between said communication device (1) and the transponder (2) can be determined, wherein the support means (39) of the circuit (37) are adapted to assist in determining at least one time value (A, B, C; (N-1), P) which represents at least a part (PCP3, PCP2, PCP1; TT, TP) of the communication time interval (CP) which starts at the starting instant (TB);

wherein the transponder (2) can enter into the communication connection with the communication device (1)

and have the communication connection with the communication device (1) starting at the starting instant (TB), and can subsequently exit from the communication connection that exists with the communication device (1) and ends at an ending instant (TE), the transponder (2) no longer has the communication connection with the communication device (1) from the ending instant (TE) onwards.

wherein the support means (39) are adapted to assist in determining the at least one time value (A, B, C; (N-1); P) which represents at least a part (PCP3, PCP2, PCP1; TT, TP) of the communication time interval (CP) which starts at the starting instant (TB) and which ends at the ending instant (TE); and wherein the transponder (2) is movable along a path of movement (x) in which a transmission magnetic field can be generated with the aid of a transmission coil configuration (27) of the communication device (1), which transmission magnetic field has a field strength variation which, along the path of movement (x), first increases to a maximum field strength value and subsequently has a field strength variation which decreases from the maximum field strength value, and wherein the support means (39) of the circuit (37) includes:
  presence detection means (43) with the aid of which it is possible to detect that the transponder (2) has entered into the communication connection with the communication device (1) and is consequently present within a communication range between the communication device (1) and the transponder (2), and
  absence detection means (43) with the aid of which it is possible to detect that the transponder (2) has exited from the communication connection with the communication device (1) and is consequently not present in the communication range.

18. A transponder (2) as claimed in claim 17, characterized in that the support means (39) of the circuit (37) include the further parts mentioned hereinafter, such that a time-value determining means (86) which can be activated after the detection that the transponder (2) has entered into the communication connection with the communication device (1) and after its activation and while the transponder (2) is within the communication range a time value (P) can be determined, which time value is representative of a time interval (TP) which elapses after the activation, and which can be deactivated after the detection that the transponder (2) has exited from the communication connection with the communication device (1), and read-out means (87, 89) with the aid of which the time value (P) determined by the time-value determining means (86) between the activation and the deactivation of this means (86) can be read out, which time value is representative of at least a part (TP) of the communication time interval (CP).

19. A transponder (2) as claimed in claim 18, characterized in that as time-value determining means (86) a counting means (86) has been provided, which can be activated and deactivated and after its activation a numerical value (P) can be determined as the time value (P), which numerical value represents the number of consecutive times that a given time unit (TU) has elapsed.

20. A circuit (37) for a transponder (2) which is adapted to provide contactless communication with a communication device (1) suitable for this purpose and which can enter into a communication connection with the communication device (1), which connection starts at a starting instant (TB), and which has the communication connection with the communication device (1) for a communication time interval (CP) which starts at the starting instant (TB), and which includes support means (39) with the aid of which at least one characteristic value (A, B, C; (N-1), P) relating to the communication between said communication device (1) and the circuit (37) can be determined, wherein the support means (39) are adapted to assist in determining at least one time value which represents at least a part of the communication time interval which starts at the starting instant;

wherein the circuit (37) can enter into the communication connection with the communication device (1) and which has the communication connection with the communication device (1) starting at the starting instant (TB), and which can subsequently exit from the communication connection that exists with the communication device (1) and ends at an ending instant (TE), and which no longer has the communication connection with the communication device (1) from the ending instant (TE) onwards;

characterized in that wherein the support means (39) are adapted to assist in determining the at least one time value (A, B, C; (N-1); P) which represents at least a part (PCP3, PCP2, PCP1) of the communication time interval (CP) which starts at the starting instant (TB) and which ends at the ending instant (TE);

wherein the circuit (37) is movable along a path of movement (x) in which a transmission magnetic field can be generated with the aid of a transmission coil configuration (27) of the communication device (1), which transmission magnetic field has a field strength variation which, along the path of movement (x), first increases to a maximum field strength value and subsequently has a field strength variation which decreases from the maximum field strength value, and the support means (7) of the circuit (37) include the parts mentioned hereinafter, such that above-threshold detection means (70, 71, 72) with the aid of which it is possible to detect that the circuit (37) which moves along the path of movement (x) has reached an above-threshold location (a1, a2, a3) where a voltage (VX) at a circuit point (42), at which a voltage (VX) appears which corresponds to the field strength (H) receivable by a transmission coil configuration (36) of the transponder (2), has exceeded a given voltage threshold value (TH1, TH2, TH3), and below-threshold detection means (70, 71, 72) with the aid of which it is possible to detect that the circuit (37) which moves along the path of movement (x) has reached a below-threshold location (b1, b2, b3) where said voltage (VX) at the circuit point (42) has decreased below said given voltage threshold value (TH1, TH2, TH3).

21. A circuit as claimed in claim 20, characterized in that the support means of the circuit include the further parts mentioned hereinafter, such that a time-value determining means which can be activated after the detection that the transponder has reached the above-threshold location and a time value can be determined, which time value is representative of a time interval which elapses after the activation, and which can be deactivated after the detection that the circuit has reached the below-threshold location, and read-out means with the aid of which the time value determined by the time-value determining means between the activation and the deactivation of this means can be read out, which time value is representative of at least a part of the communication time interval.

22. A circuit as claimed in claim 21, characterized in that as time-value determining means a counting means has been provided, which counting means can be activated and deactivated and, after its activation, a numerical value can be determined as the time value, which numerical value represents the number of consecutive times that a given time unit has elapsed.

23. A circuit (37) for a transponder (2), said circuit (37) being adapted to provide contactless communication with a communication device (1) and being capable of entering into a communication connection with the communication device (1), which connection starts at a starting instant (TB), said circuit (37) having the communication connection with the communication device (1) for a communication time interval (CP) which starts at the starting instant (TB);

wherein said circuit (37) includes support means (39) with the aid of which at least one characteristic value (A, B, C; (N-1), P) relating to the communication between said communication device (1) and the circuit (37) can be determined, wherein the support means (39) are adapted to assist in determining at least one time value which represents at least a part of the communication time interval which starts at the starting instant;

wherein said circuit (37) can enter into the communication connection with the communication device (1) and has the communication connection with the communication device (1) starting at the starting instant (TB), and can subsequently exit from the communication connection that exists with the communication device (1) and ends at an ending instant (TE), said circuit (37) no longer having the communication connection with the communication device (1) from the ending instant (TE) onwards, wherein the support means (39) are adapted to assist in determining the at least one time value (A, B, C; (N-1); P) which represents at least a part (PCP3, PCP2, PCP1) of the communication time interval (CP) which starts at the starting instant (TB) and which ends at the ending instant (TE); and wherein the circuit (37) is movable along a path of movement (x) in which a transmission magnetic field can be generated with the aid of a transmission coil configuration (27) of the communication device (1), which transmission magnetic field has a field strength variation which, along the path of movement (x), first increases to a maximum field strength value and subsequently has a field strength variation which decreases from the maximum field strength value;

wherein the support means (39) of the circuit (37) includes presence detection means (43) with the aid of which it is possible to detect that the circuit (37) has entered into the communication connection with the communication device (1) and is consequently present within a communication range between the communication device (1) and the circuit (37), and absence detection means (43) with the aid of which it is possible to detect that the circuit (37) has exited from the communication connection with the communication device (1) and is consequently not present in the communication range.

24. A circuit (37) as claimed in claim 23, wherein the support means (39) includes time-value determining means (86) which can be activated after the detection that the circuit (37) has entered into the communication connection with the communication device (1) and after its activation and while the circuit (37) is within the communication range a time value (P) can be determined, which time value is representative of a time interval which elapses after the activation, and which can be deactivated after the detection that the circuit (37) has exited from the communication connection with the communication device (1), and read-out means (87, 89) with the aid of which the time value (P) determined by the time-value determining means (86) between the activation and the deactivation of this means (86) can be read out, which time value is representative of at least a part (TP) of the communication time interval (CP).

25. A circuit (37) as claimed in claim 24, wherein as time-value determining means (86) a counting means (86) has been provided, which can be activated and deactivated and after its activation a numerical value (P) can be determined as the time value (P), which numerical value represents the number of consecutive times that a given time unit (TU) has elapsed.

* * * * *